United States Patent [19]
Kikuchi

[11] Patent Number: 5,838,374
[45] Date of Patent: Nov. 17, 1998

[54] AUTOFOCUS VIDEO CAMERA THAT CAN COMPENSATE FOR VARIATION IN THE AMOUNT OF LOAD ON A MOBILE UNIT OF A LINEAR MOTOR IN A FOCUS OPERATION

[75] Inventor: Kenichi Kikuchi, Daito, Japan

[73] Assignee: Sanyo Electric Co., Ltd., Osaka, Japan

[21] Appl. No.: 559,653

[22] Filed: Nov. 20, 1995

[30] Foreign Application Priority Data

Nov. 25, 1994 [JP] Japan ..................................... 6-291447
Jun. 23, 1995 [JP] Japan ..................................... 7-157843

[51] Int. Cl.$^6$ .................................................. H04N 5/232
[52] U.S. Cl. .......................... 348/351; 348/354; 348/357; 396/83; 396/93; 396/118
[58] Field of Search ..................................... 348/345, 349, 348/351, 354, 355, 356, 357; 396/79, 83, 89, 93, 118, 133, 134; H04N 5/232

[56] References Cited

U.S. PATENT DOCUMENTS

| | | | |
|---|---|---|---|
| 4,570,185 | 2/1986 | Arai et al. | 358/227 |
| 5,005,040 | 4/1991 | Norita et al. | 354/402 |
| 5,057,859 | 10/1991 | Ishimaru | 354/400 |
| 5,325,145 | 6/1994 | Hirasawa | 354/400 |
| 5,387,936 | 2/1995 | Katsumoto | 348/335 |
| 5,404,013 | 4/1995 | Tajima | 250/332 |
| 5,479,236 | 12/1995 | Tanaka | 354/430 |

FOREIGN PATENT DOCUMENTS

| | | | |
|---|---|---|---|
| 63-215268 | 9/1988 | Japan | H04N 5/232 |
| 6201975 | 7/1994 | Japan | G02B 7/09 |
| 2205003 | 11/1988 | United Kingdom | H02K 41/035 |

*Primary Examiner*—Wendy Garber
*Assistant Examiner*—Ngoc-Yen Vu
*Attorney, Agent, or Firm*—Michaelson & Wallace; Peter L. Michaelson

[57] ABSTRACT

A calculation circuit compares a current focus evaluation value provided from a focus evaluation value generation circuit, with a focus evaluation value, of one preceding field stored in a memory, to determine whether a CCD is in-focus or not. The calculation circuit provides a driving signal VD to a linear motor so that the CCD moves toward the in-focus position. A position prediction circuit predicts the position where the CCD arrives after a predetermined time period according to the driving signal VD. A comparator circuit compares a predicted result from the position prediction circuit with the actual moved position of the CCD detected by a position detection circuit to provide a signal Dpr corresponding to an amount of load according to the comparison result. A correction value determination circuit and a bias determination circuit correct the level of driving signal VD in response to signal Dpr to supply a second corrected driving signal VD2 to a voice coil.

3 Claims, 19 Drawing Sheets

AUTOFOCUS VIDEO CAMERA THAT CAN COMPENSATE FOR VARIATION IN THE AMOUNT OF LOAD ON A MOBILE UNIT OF A LINEAR MOTOR IN A FOCUS OPERATION

BACKGROUND OF THE INVENTION

1. Field of the Invention

The present invention relates to a video camera including an automatic focus adjustment function, and more particularly, to an autofocus video camera that can compensate for influence of variation in the amount of load exerted on a mobile unit of a linear motor during automatic focus adjustment.

2. Description of the Background Art

In a conventional autofocus adjustment device employed in an image sensing apparatus such as a video camera, a method is adapted of using a video signal per se obtained from an image sensing device for evaluation of the focus control state. This system has various advantages such as the absence of parallax and achieving accurate focusing even in the case where the depth of field is small or the object of interest is located far away. This system is also advantageous from the stand point of structure since it is not necessary to additionally provide a particular sensor for autofocusing.

One example of the focus control method using a video signal is the conventional control system referred to as the hill-climbing servo system. An autofocus apparatus employing this hill-climbing servo system is disclosed in Japanese Patent Laying-Open No. 63-215268 (H04 N5/232), for example. In the hill-climbing servo system, an integral value of one screen of the high frequency component of the obtained video signal, i.e. an integral value of one field period, is detected as a focus evaluation value for each field. This focus evaluation value is constantly compared with that of a preceding field. The position of the focus lens is constantly fine-adjusted so that the focus evaluation value takes the maximum value. By this control operation, the in-focus position of the focus lens is detected and maintained.

In the above conventional technique, the means for altering the relative position of lens with respect to the image sensing device in the direction of the optical axis includes a motor such as a stepping motor or a DC motor, and a driving force transmission mechanism that converts the torque obtained by the drive of the motor into a driving force for linearly moving the lens or the image sensing device. Disadvantageously, it is difficult to reduce the size and weight of the mechanism as well as the power consumption.

In view of the foregoing, a mechanism is employed for altering the position of the lens or the image sensing device by means of a linear motor. This mechanism allows reduction in the size and weight of the driving mechanism and power consumption. FIG. 15 is a block diagram schematically showing the structure of an autofocus video camera employed a linear motor as the driving means.

The focus adjustment device of a video camera is constructed so as to carry out focus adjustment by moving the optical lens or the image sensing device in the direction of the optical axis by a voice coil motor. Referring to FIG. 15, an optical lens 1 is fixed and an image sensing device (referred to as CCD hereinafter) 2 is moved along the direction of the optical axis. In the following description, CCD 2 and the member that is displaced integrally with CCD 2 are called the "mobile unit".

Focus adjustment operation will now be described in detail. An image formed by lens 1 is photoelectric-converted by CCD 2. This image sensed output is converted into a video signal by an image sensing circuit 3 and then amplified to a predetermined level by an amplifier circuit 4. The amplified signal is supplied to the recording system of the video tape recorder (VTR) as well as to a focus evaluation value generation circuit 5.

Focus evaluation value generation circuit 5 includes a high pass filter (HPF) 5a that extracts the high frequency component of a video signal as shown in FIG. 16, an A/D converter 5b for converting the output of HPF 5a into a digital value, a gate circuit 5c that transmits only the values within a focus area located at the center of an image in the A/D converted output, and a digital integrator 5d for digitally-integrating an output of gate circuit 5c over one field period. The output of focus evaluation value generation circuit 5 becomes the digital integral value over one field period of the high frequency component of a video signal. This integral value is provided, as shown in FIG. 15, to a calculation unit 6 of the succeeding stage and to a memory 50 as a focus evaluation value.

Calculation unit 6 emits a driving signal VD of a voltage level of m to displace CCD 2 in one direction of the optical axis, and compares the latest focus evaluation value from focus evaluation value generation circuit 5 with the focus evaluation value of the previous field stored in memory 50 to determine the in-focus state of the image sensed screen as set forth in the following. When the latest focus evaluation value is greater than that for the previous field, determination is made that the in-focus position is in the current direction of travel. Therefore, calculation unit 6 continues the output of driving signal VD of the voltage level of m. Conversely, when the focus evaluation value of the preceding field is greater than that for the latest focus evaluating value, a determination is made that the mobile unit is moving in a direction farther away from the in-focus position. Therefore, calculation unit 6 alters the voltage level of driving signal VD to m from n. In response, the direction of travel of CCD 2 is reversed, so that CCD 2 is moves towards the in-focus position where the focus evaluation value is greatest.

When CCD 2 moves toward the direction of increasing the focus evaluation value and passes the in-focus position where the focus evaluation value is maximum to result in a lower focus evaluation value, calculation unit 6 generates driving signal VD of a level that reverses the direction of travel of CCD 2 such that it will return to the position where the maximum value is obtained.

Memory 50 stores the focus evaluation value of a field immediately preceding the latest field. When the comparison operation by calculation unit 6 is completed, the stored contents in memory 50 is updated by the latest focus evaluation value obtained from focus evaluation value generation circuit 5.

FIG. 17 and FIG. 18 (sectional view taken along line C–C' of FIG. 17) are partial sectional views indicating the structure of the autofocus adjustment device including CCD 2 and lens 81 and 82 taken in a direction parallel to and vertical to the optical axis, respectively.

Voice coil motor 53 is one type of a linear motor. The structure thereof is basically identical to that of a loudspeaker. Referring to FIG. 17, a center yoke 23 having a cross section of a rough C-shape is fixed to a fixed yolk unit 90a of a fixed base 90 of the camera unit of the video camera. As shown in FIG. 18, each of the four center yokes 23 are fixed along the four sides of the square fixed yolk unit 90a. Referring to FIG. 17 again, a permanent magnet 24 having one magnetic pole facing the inward direction is fixed at the inner surface of each center yoke 23. Furthermore, the main body of the camera has a shaft attachment plate 91 fixed parallel to fixed yolk unit 90a. Each one end of two guide shafts 51a and 51b oriented parallel to the optical axis direction is coupled to attachment plate 91. The other ends of guide shafts 51a and 5b are coupled to fixed yolk unit 90a as shown in FIG. 18.

Lens 82 and 81 are fixed between opposing center yokes 23 and at an opening 90e of fixed base 90.

Mobile base 52 includes fitting holes 52a and 52b on a diagonal thereof. Mobile base 52 is supported in a slidable manner with respect to the direction of the optical axis by guide shafts 51a and 52b being fitted into holes 52a and 52b, respectively. Mobile base 52 has a rectangular tube-like bobbin 22 wound with a conductor as a driving coil (referred to as voice coil hereinafter) 20 fixed so as to face respective permanent magnets 24 along the optical axis. An opening 52c for transmitting incident light is formed at the front portion of mobile base 52 (the side closer to the lens). Furthermore, CCD 2 is fixed at the rear portion of mobile base 52 (the side farther from the lens). Optical filters 83, 84 and 85 disposed as the preceding stages of the CCD 2 are infrared cut filters and optical LPFs (low pass filters). The incident light through lens 81 and 82 passes through opening 52c to form an image on CCD 2 via optical filters 83, 84 and 85.

When a current is conducted in driving coil 20, mobile unit 60 including driving coil 20, bobbin 22, mobile base 52 and CCD 2 integrally is guided by guide shafts 51a and 51b to travel in the optical axis direction.

The characteristics of driving signal VD toward voice coil motor 53 are set forth in the following. Voice coil motor 53 has the direction and speed of the drive of bobbin 22 varied according to the direction and the level of current, respectively, conducted in driving coil 20. When control is effected by driving voice coil motor 53 according to an output from calculation unit 6, a voltage application method is adapted as set forth in the following. As shown in FIG. 15, driving coil 20 has one end supplied with a constant reference voltage VREF and the other end supplied with driving signal VD from calculation unit 6. The direction and level of the current flowing in voice coil 20 varies according to the potential level of signal VD with respect to voltage VREF.

In the prior art of FIG. 15, only coil 20 is illustrated for the sake of simplification. The illustration of the other components of voice coil motor 53 are not otherwise described.

An autofocus video camera of the above-described structure using a linear motor as the driving source for CCD 2 to perform focus adjustment by moving CCD 2 in the optical axis direction has disadvantages set forth in the following.

Mobile unit 60, shown in FIG. 17, receives a load due to various factors. The magnitude of this load varies according to the position of mobile unit 60. In such a case, the state of an external force exerted on mobile unit 60 including CCD 2 varies and greatly depending upon the position of mobile unit 60. It is therefore difficult to stably control mobile unit 60 at each position by just supplying a corresponding driving signal VD.

This issue will be described in detail with reference to FIGS. 19, 20A, 20B, 21A and 21B. FIG. 19 is a schematic diagram showing thrust (Ftl and Ftr for thrust exerted in the left and right directions, respectively) exerted on mobile unit 60 when held at a horizontal state. As shown in FIG. 20A, when the driving signal has an absolute value equal to that of reference voltage VREF and is switched in direction for every constant time period, thrusts Ftl and Ftr and of the same magnitude and offset each other by 180° act on mobile unit 60 leftward and rightward, respectively, in the horizontal direction. Assuming that no load is exerted on mobile unit 60, the force acting in the direction of displacement of mobile unit 60 is only these two thrusts of Ftl and Ftr. Therefore, the mobile unit position varies symmetrically as shown in FIG. 20B.

The ordinates of FIGS. 20B and 21B indicate the distance from a reference position P0 shown in FIG. 19 to the center of mobile unit 60.

The case where there is a load acting on mobile unit 60 will be considered in the following. Referring to FIG. 17, CCD 2 fixed to mobile unit 60 includes a lead unit 70 for receiving/transmitting signals with the outside world. Since lead unit 70 is generally formed of a magnetic material, lead unit 70 receives an attraction force Fmg leftward from permanent magnet 24. Mobile unit 60 has a cable 71 attached via lead unit 70 for the purpose of signal input/output with CCD 2. Cable 71 is generally formed of a flexible elastic printed substrate. When cable 71 is connected to lead unit 70 at the right side of CCD 2 and bent to be extended from an upper plane of fixed base 90 through opening 90d formed in fixed base 90 to be fixed, an elastic force Fk of cable 71 is generated leftward as shown in FIG. 17. Therefore, the arrangement of voice coil motor 53, mobile unit 60 and cable 71 as shown in FIG. 17 causes a load of (Fmg+Fk) to be exerted leftward on mobile unit 60.

FIGS. 21A and 21B are diagrams for describing the control operation with respect to mobile unit 60 when driving voltage VD as shown in FIGS. 20A and 20B are applied under the state where the above-described load is exerted. Load (Fmg+Fk) works in addition to the thrust (Ftl, and Ftr) in the direction of displacement of mobile unit 60. As a result, mobile unit 60 receives a composite force of (Ftl+Fmg+Fk) in the leftward direction and a composite force of (Ftr−Fmg−Fk) in the rightward direction. Within a constant time period, the amount of travel in the leftward direction is greater, and the amount of travel in the rightward direction is smaller than the case where there is no load. Therefore, the position of mobile unit 60 will be gradually shifted leftward as shown in FIG. 21B. This means that the position control of mobile unit 60 must be performed in consideration of the level and direction of such a load working on mobile unit 60. Furthermore, since the actual load varies according to the position of mobile unit 60 as described above, the structure of the position control mechanism must also accommodate the position dependency of the load.

Additionally, weight and frictional force between guide shafts 51a and 51b also act on mobile unit 60. Such elements will also cause additional loading on mobile unit 60.

The operation of controlling the position of mobile unit 60 according to driving signal VD with the video camera is tilted upward or downward during shooting will be described hereinafter.

FIG. 22 shows the case where mobile unit 60 is held in a horizontal manner. Here, gravity mg is exerted vertically downwards on mobile unit 60 when the mass of mobile unit 60 is m and the acceleration of gravity is g. A case is considered where driving signal VD having an absolute value identical to that of reference voltage VREF and switched in direction for every constant time period is applied as shown in FIG. 23A. Thrusts Ftl and Ftr differing by 180° with the same magnitude are exerted leftward and rightward in the horizontal direction, respectively. Neglecting the frictional force between mobile unit 60 and support shaft 51a (only 51a of support shafts 51a and 51b is considered for simplification) as an ideal condition, the mobile unit position varies symmetrically as shown in FIG. 23B since the only force acting in the direction of displacement of mobile unit 60 in the horizontal state is the two thrusts. In FIGS. 23B, 25B and 27B, the ordinates indicates the distance from reference position P0 shown in FIGS. 22, 24 and 26 to the center of mobile unit 60.

FIG. 24 is a schematic diagram showing mobile unit 60 tilted by a constant angle of α. When a driving signal VD similar to that of FIG. 23A is applied in this state, a component of force (mg×sinα) of gravity mg toward the direction of displacement is exerted in addition to thrusts Ftl or Ftr in the direction of displacement of mobile unit 60. As a result, mobile unit 60 receives a composite force of (Ftl+mg·sinα) in the leftward direction and a composite force (Ftr−mg·sinα) in the rightward direction. Therefore, the amount of travel of mobile unit 60 within a constant time period is greater than that of a horizontal state and the rightward amount of travel is smaller. The mobile unit position will gradually be shifted leftward as shown in FIG. 25B.

The influence of frictional force will now be described. FIG. 26 is a schematic diagram showing mobile unit 60 held in a horizontal state. When a driving signal VD similar to those of FIG. 23A is applied in this state, frictional forces Ffl or Ffr (Ffl and Ffr being frictional forces exerted in the left and right directions, respectively) between mobile unit 60 and support shaft 51a are exerted in addition to thrust Ftl or Ftr in the direction of displacement of mobile unit 60. As a result, mobile unit 60 receives a composite force of (Ftl−Ffr) when moving leftward, and a composite force of (Ftr−Ffl) when moving rightward. Here, Ffl=−Ffr=$\mu$N=$\mu$mg where the vertical reaction from support shaft 51a is N, and the frictional coefficient between mobile unit 60 and support shaft 51a is $\mu$. Since Ftl=−Ffr=Ftr−Ffl, the position of mobile unit 60 varies symmetrically as shown in FIG. 27B.

FIG. 28 is a schematic diagram showing mobile unit 60 tilted by a constant angle of α. When a driving signal VD similar to those of FIG. 23A is applied in this state, a frictional force Ffl' or Ffr' between mobile unit 60 and support shaft 51a is exerted in addition to thrust Ftl or Ftr in the direction of displacement of mobile unit 60. It is to be noted that the component of force of gravity toward the direction of displacement is neglected here. As a result, mobile unit 60 receives a composite force of (Ftl−Ffr') when moving leftward and a composite force of (Ftr−Ffl') when moving rightward. In this case, the composite force acting on mobile unit 60 is greater than that when held horizontal since Ffl'=−Ffr'=$\mu$N=$\mu$mg·cosα<$\mu$mg. Displacement of the mobile unit position when tilted is greater than that when held horizontally even if the same driving signal VD is applied as shown in the solid line and the broken line in FIG. 29B.

As described above, the amount of displacement of mobile unit 60 according to voice coil motor 20 differs when the video camera is held in a horizontal manner from the case where the video camera is held in a tilted manner even when driving signal VD of the same level is provided from calculation unit 6. There is a possibility that when the in-focus position is located at an upward tilt in a tilted state, the time required for CCD 2 to travel to the in-focus position becomes much longer than that for a horizontal state. Therefore, a quick in-focus operation cannot easily be obtained. Furthermore, when the tilting angle is significantly great, there is a possibility that mobile unit 60 is driven farther away from the in-focus position even when the position of mobile unit 60 is controlled so as to climb the tilted plane.

SUMMARY OF THE INVENTION

An object of the present invention to provide an autofocus video camera that allows stable focus adjustment operation even when a load acts on a mobile unit in the focus adjustment mechanism.

Another object of the present invention is to provide an autofocus video camera that compensates for influence of action of a magnetic force from a magnet forming a linear motor in a mobile unit in a focus adjustment mechanism and that allows a stable and rapid focus adjustment operation.

A further object of the present invention is to provide an autofocus video camera that compensates for influence of action of a load caused by a physically elastic signal interconnection and the like connected to a mobile unit in a focus adjustment mechanism in order to preform a stable focus adjustment operation.

Still another object of the present invention is to provide an autofocus video camera that can eliminate influence of weight and frictional force that varies due to the optical axis of a focus adjustment mechanism being tilted from the horizontal state so that a mobile unit can be controlled in a manner identical to that of the horizontal state.

A still further object of the present invention is to provide an autofocus video camera that can reduce a load acting on a mobile unit so as to perform a stable focus adjustment operation by disposing a plurality of structural members that apply load to the mobile unit in a focus adjustment mechanism so as to cancel the direction of action of respective loads.

An autofocus video camera of the present invention includes an image sensing circuit, a linear motor, a focus control circuit, a load calculation circuit, and a level correction circuit.

The image sensing circuit includes a lens and an image sensing device. With either the lens or the image sensing device as a mobile unit, the linear motor biases the mobile unit according to a driving signal on an optical axis of the lens and the image sensing device. The focus control circuit provides a driving signal so that the mobile unit moves towards an in-focus position. The load calculation circuit calculates an amount of the load acting on the mobile unit in the direction of the optical axis. The level correction circuit responds to the amount of load to correct the output level of the driving signal.

According to the present invention, a main advantage of an automatic focus adjustment device that preforms focus adjustment by moving an image sensing device or lens in the direction of the optical axis by a linear motor is to suppress influence of a load so as to allow a focus adjustment operation similar to that when there is no load. Further, the amount of travel of the mobile unit per unit time does not vary in the direction of travel.

Another advantage of the present invention is to allow calculation of the amount of load by just detecting the position of the mobile unit in the direction of the optical axis. The influence of load can then be suppressed by an extremely simple structure.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6C are timing charts showing the driving signal of the first embodiment over time wherein FIG. 6A shows output of a driving signal prior to correction, FIG. 6B shows a bias voltage applied for correction, and FIG. 6C shows a driving voltage after correction.

FIGS. 14A to 14E are timing charts showing a driving signal subjected to correction over time wherein FIG. 14A shows a driving signal prior to correction, FIG. 14B shows a correction signal with respect to frictional force, FIG. 14C shows a corrected driving signal with respect to frictional force, FIG. 14D shows a correction signal with respect to gravity, and FIG. 14E shows a corrected driving signal with respect to gravity.

FIGS. 20A and 20B are timing charts showing a driving signal and a mobile unit position over time when there is no load, wherein FIG. 20A shows a driving signal and FIG. 20B shows a mobile unit position.

FIGS. 21A and 21B are timing charts showing a driving signal and a mobile unit position over time when a load is exerted on the mobile unit, wherein FIG. 21A shows a driving signal and FIG. 21B shows a mobile unit position.

FIGS. 23A and 23B are timing charts showing a driving signal and a mobile unit position over time when the mobile unit is held in a horizontal manner, wherein FIG. 23A shows a driving voltage and FIG. 23B shows a mobile unit position.

FIGS. 25A and 25B are timing charts showing a driving signal and a mobile unit position over time when the mobile unit is tilted, wherein FIG. 25A shows the driving signal and FIG. 25B shows the mobile unit position.

FIGS. 27A and 27B are timing charts showing a driving signal and a mobile unit position over time when the mobile unit is held in a horizontal state, wherein FIG. 27A shows the driving signal and FIG. 27B shows the mobile unit position.

FIGS. 29A and 29B are timing charts showing a driving signal and a mobile unit position over time when the mobile unit is tilted, wherein FIG. 29A shows the driving signal and FIG. 29B shows the mobile unit position.

DESCRIPTION OF THE PREFERRED EMBODIMENTS

FIRST EMBODIMENT

Figure 1:
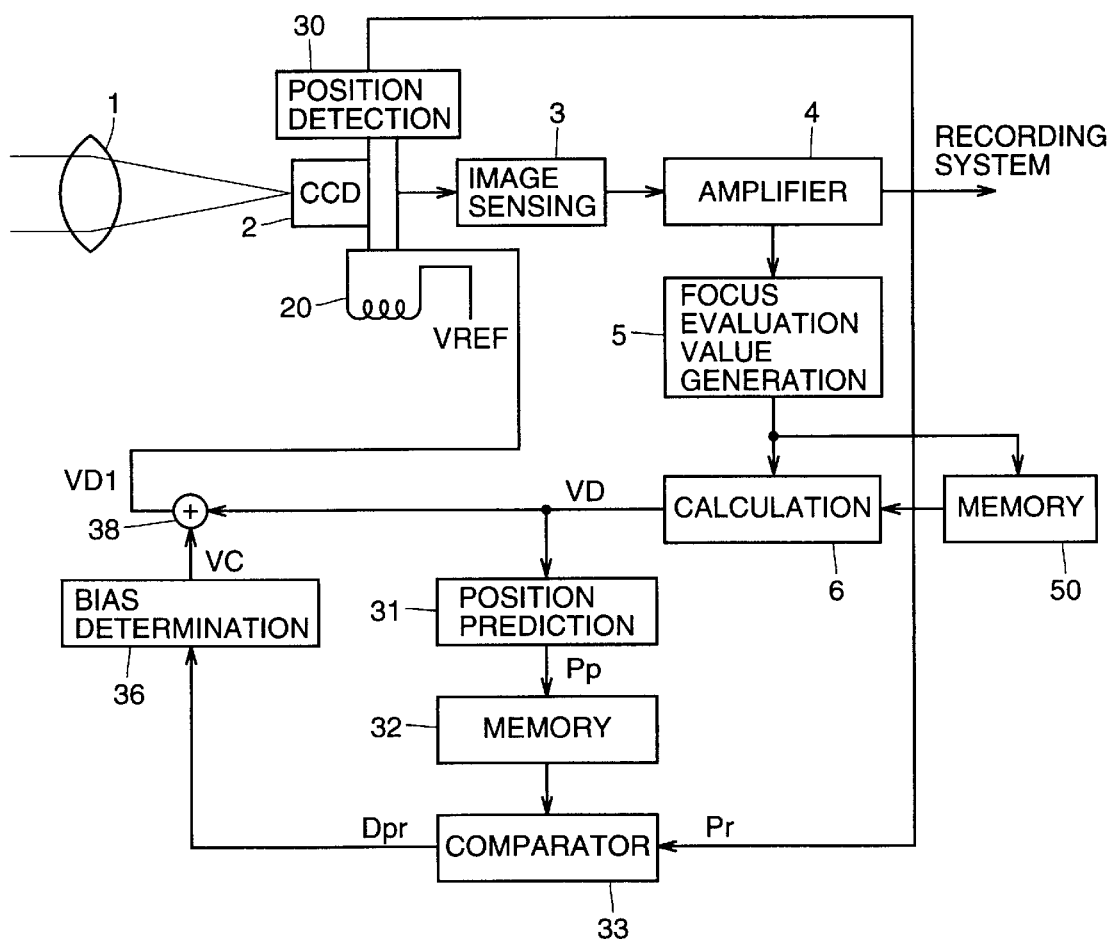
FIG. 1 is a block diagram schematically showing a focus adjustment device 100 of an autofocus video camera according to a first embodiment of the present invention.

FIG. 1 is a schematic block diagram showing a structure of an automatic focus adjustment device 100 of an autofocus video camera according to a first embodiment of the present invention.

Automatic focus adjustment device 100 includes an optical lens 1 for converging light from an object of interest, a CCD 2 receiving the converged light, an image sensing circuit 3 for receiving an output of CCD 2 and providing a video signal, an amplifier circuit 4 for amplifying the received output from image sensing circuit 3 to a predetermined level and providing an amplified signal, a focus evaluation value generation circuit 5 for receiving an output of amplifier circuit 4 and providing a focus evaluation value, a memory 50 for storing a focus evaluation value of one preceding field, a calculation circuit 6 which determines an in-focus state by comparing the latest focus evaluation value from focus evaluation value generation circuit 5 and the focus evaluation value of the previous field stored in memory 50 and provides a driving signal VD to move CCD 2 to the in-focus position, a position prediction circuit 31 for receiving a signal VD to predict the position of CCD 2 after a predetermined time period elapses and provides data Pp which indicates the predicted position (referred to as predicted position data Pp hereinafter), a memory circuit 32 receiving predicted position signal data Pp and storing this signal for a predetermined time period, a position detection circuit 30 for detecting the position of CCD 2 and providing data Pr indicating the actual measured position (referred to as actual measured position data Pr hereinafter), a comparator circuit 33 which receives predicated position data Pp and actual measured position data Pr and calculates a the amount of load for providing a drive load signal Dpr, a bias determination circuit 36 receiving signal Dpr to determine a correction bias value and to provide a bias voltage VC, an adder circuit 38 which receives driving signal VD and bias voltage VC for providing the added result as a corrected driving signal VD1, and a voice coil 20 for generating a driving force according the corrected driving signal VD1.

Figure 17:
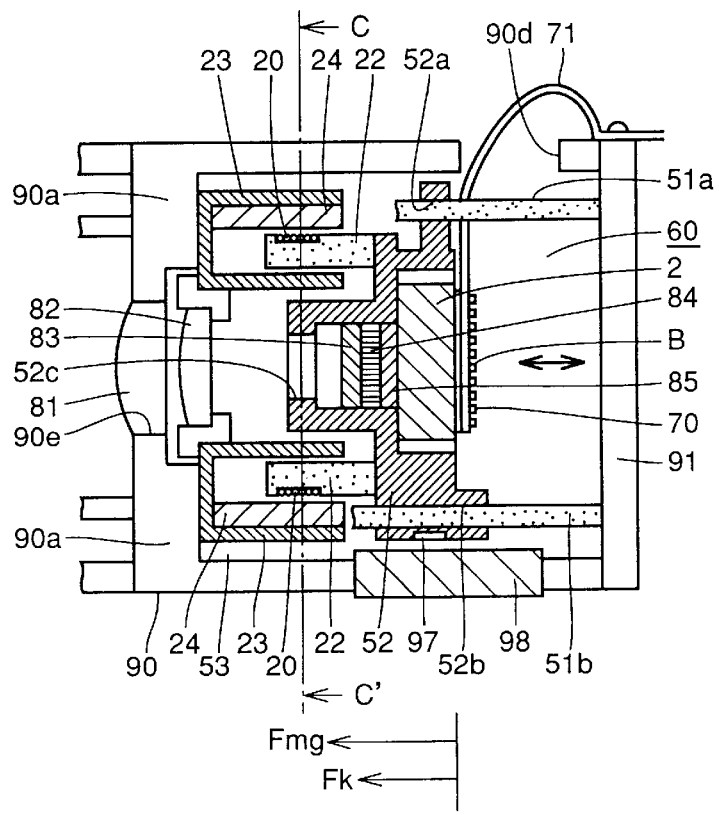
FIG. 17 is a partial sectional view showing a structure of a conventional autofocus video camera.
Figure 18:
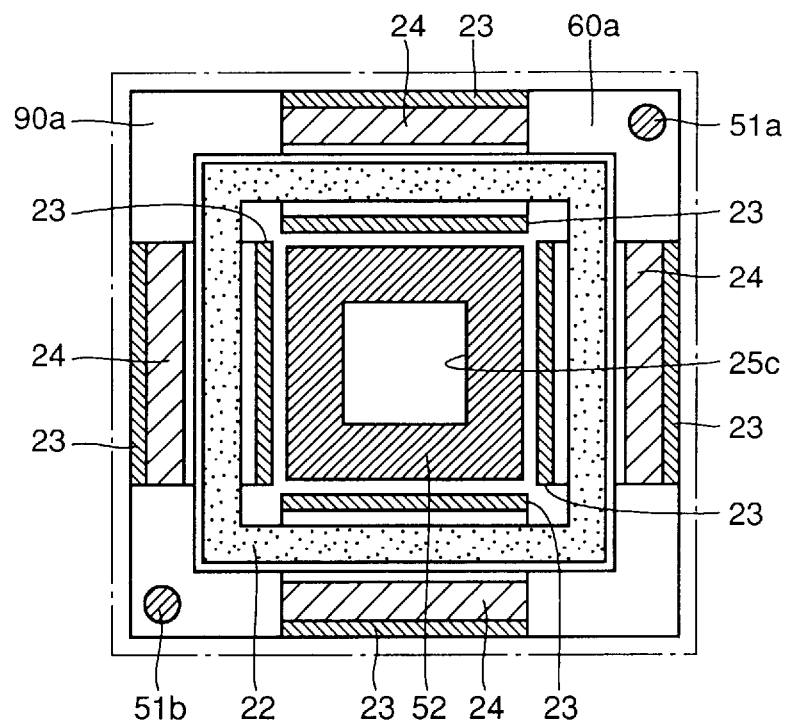
FIG. 18 is a side sectional view of the conventional autofocus video camera of FIG. 17 taken along line C–C'.
Figure 19:
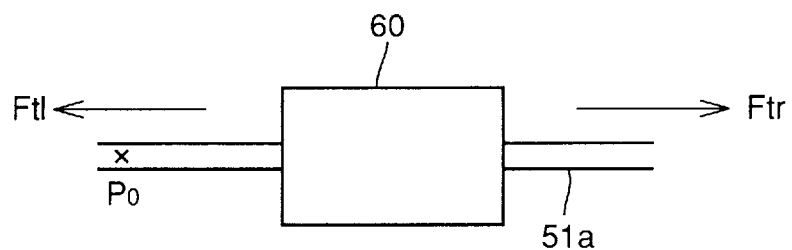
FIG. 19 is a schematic diagram showing the thrust when a load is not applied on the driving unit.
Figure 20A:
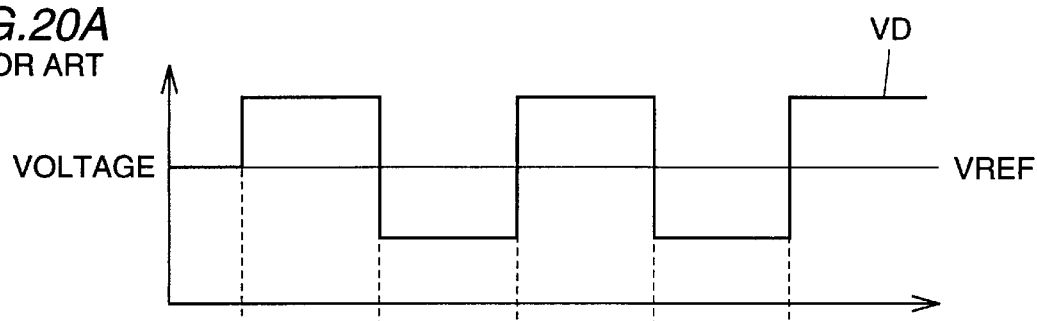
Figure 20B:
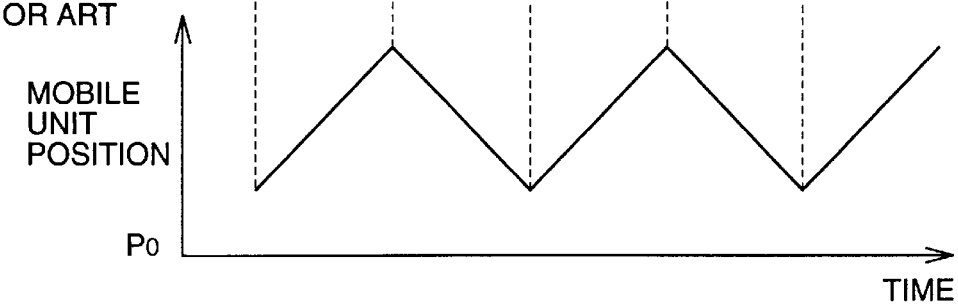

The mechanical structure of the first embodiment is similar to that of the conventional automatic focus adjustment device shown in FIG. 17.

Therefore, in the present embodiment, the direction of action of load by the attraction force due to the magnetic force between permanent magnet 24 and lead unit 70 is equal to the direction of action of load by the elasticity of cable 71.

The operation of the automatic focus adjustment device of the present embodiment will now be described though centering on the difference over the conventional device.

Driving signal VD has a potential level of altering CCD 2 in a direction where the focus evaluation value is increased by a predetermined amount. Driving signal VD from calculation circuit 6 is applied to position prediction circuit 31. The relationship between the level of driving signal VD and the amount of travel of mobile unit 60 will be described prior to the description of the position prediction operation by position prediction circuit 31.

When the difference between the value of driving signal VD and reference voltage VREF is large so that a larger amount of current is applied to driving coil 20, the thrust generated by voice coil motor 53 shown in FIG. 17 is increased. Therefore, the amount of travel of mobile unit 20 per unit time increases.

Figure 2:
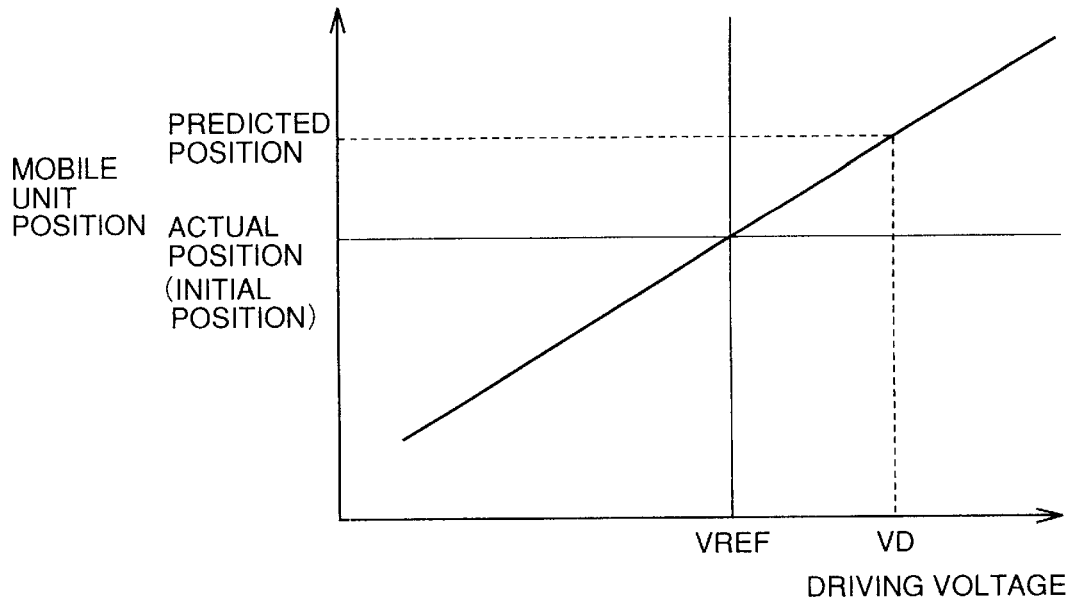
FIG. 2 is a diagram for describing an operation of a position prediction circuit 31 according to the first embodiment.

By obtaining in advance the relationship between the signal level of driving signal VD and the amount of travel of mobile unit 60 logically or experimentally, the position of mobile unit 60 at the elapse of a unit time period can be predicted according to the level of driving signal VD. For example, when the signal level of driving signal VD in voice coil motor 53 is proportional to the mobile unit position at an elapse of the unit time period, the predicted position at an elapse of a predetermined time period with respect to the signal level of driving signal VD can be identified as shown in FIG. 2.

Position prediction circuit 31 predicts the position of mobile unit 60 at an elapse of a predetermined time period t according to the input driving signal VD. Predicted position data Pp indicating this predicted position is applied to memory 32 and maintained therein until a predetermined time t elapses. At the elapse of predetermined time t, predicted position data Pp stored in memory 32 is provided to comparator circuit 33. A position detector 30 is provided in the proximity of mobile unit 60 to detect the actual position of mobile unit 60 in the direction of the optical axis along the path of travel. Data Pr indicating the real position detected by position detector 30 (actual measured position) is applied to comparator circuit 33.

Comparator circuit 33 is supplied with the initial position of mobile unit 60, just before CCD 2 is moved for a predetermined time period by driving signal VD from position detector 30, as an initial value Pi. Comparator circuit 33 receives predicted position data Pp at a elapse of a predetermined time period t to calculate the predicted amount of travel Kp of mobile unit 60 as Kp=|Pp−Pi|. Similarly, comparator circuit 33 receives actual measured position data Pr to calculate the actual amount of travel Kr as Kr=|Pr−Pi|. Comparator circuit 33 also calculates the difference between the predicted and actual amount of travel from the calculated predicted value Kp and actual measured value Kr by Dpr= Kr−Kp=|Pr−Pi|−|Pp−Pi|.

Position detector 30 of FIG. 1 includes an LED 97 mounted at the bottom of mobile base 52 of mobile unit 60, and an optical sensor 98 fixed at the bottom of fixed base 90 so as to face LED 97, as shown in FIG. 17. The position of mobile unit 60 in the optical axis direction can be identified by detecting where the light from LED 97 is directed on optical sensor 98.

The calculated difference in the amount of travel Dpr is applied to a succeeding bias determination circuit 36 as a value corresponding to the amount of load in the optical axis direction.

Figure 3:
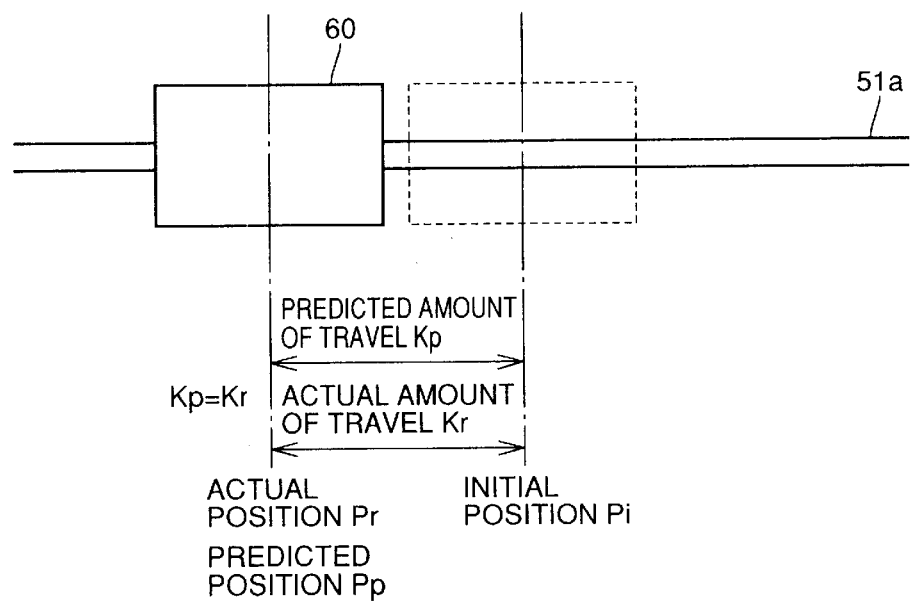
FIGS. 3, 4 and 5 are schematic diagrams showing the relationship between a predicted amount of travel and the actual amount of travel when the load is 0, negative, and positive, respectively.
Figure 4:
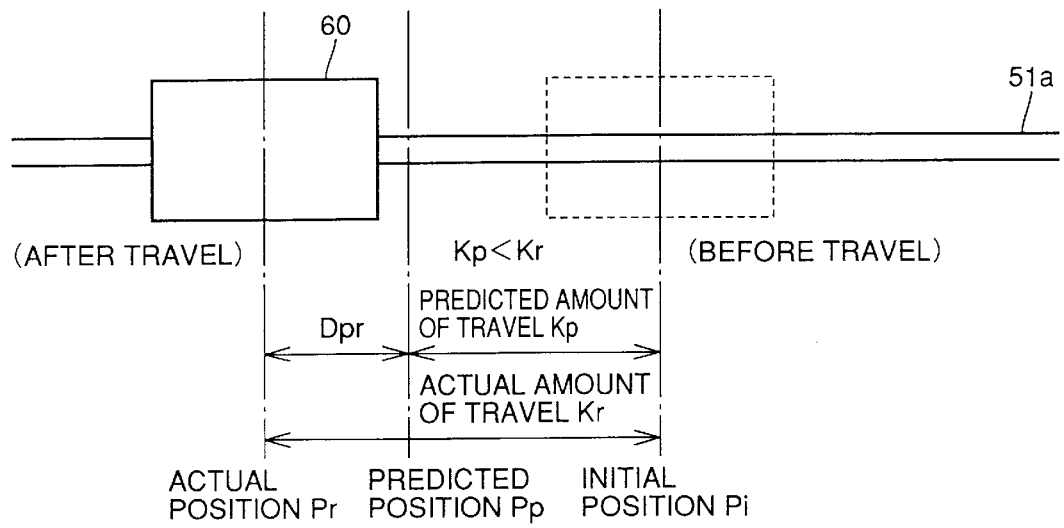
Figure 5:
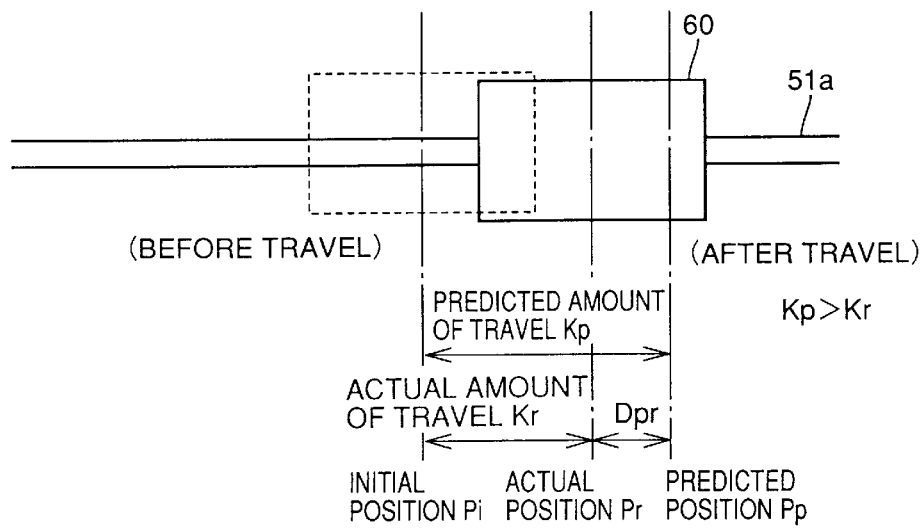

The relationship between the difference in the amount of travel Dpr and the amount of load now will be described. When this difference in the amount of travel Dpr is approximately 0 as shown in FIG. 3, i.e. when Kp=Kr, bias determination circuit 36 determines that no load is exerted on mobile unit 60. In FIGS. 3–5, the initial position is the position of mobile unit 60 prior to the accumulation of the predetermined time t. The actual measured position corresponds to the real position of mobile unit 60 after being driven for a predetermined time period t (the data corresponding to the distance between the initial position and the actual position is labelled Kr) by driving signal VD from calculation circuit 6. The predicted position corresponds to the position where mobile unit 60 is expected to be located by position predication circuit 31 at an elapse of a predetermined time t on the basis of mobile unit 60 located at the initial position (the data corresponding to the distance between the initial position and the predicated position is labeled Kp).

When difference Dpr is positive, i.e. (the actual amount of travel Kr)>(predicated amount of travel Kp) as shown in FIG. 4, bias determination circuit 36 determines that the thrust of voice coil motor 53 and the force by the load are exerted in the same direction.

When difference Dpr between predicated position data Pp and actual measured position data Pr is negative, i.e. Kp>Kr as shown in FIG. 5, bias determination circuit 36 determines that the thrust of voice coil motor 53 and the force by the load are exerted in opposite directions. The amplitude of the load increases monotonically with respect to an absolute value of the difference of the amount of travel |Dpr|=|Kr−Kp|. Therefore, bias determination circuit 36 can determine the state of the load acting on mobile unit 60 by ascertaining which is greater, i.e. predicted position data Pp and actual measured position data Pr, and the difference therebetween.

Bias determination circuit 36 generates a correction signal VC according to the value of difference Dpr. Correction signal VC and driving signal VD provided from calculation circuit 6 are combined (superimposed) in an adder circuit 38. A corrected driving signal VD1 is provided from adder circuit 38.

Figure 6A:
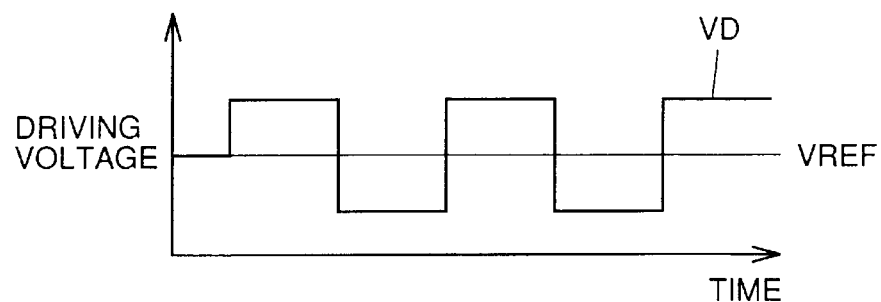
Figure 6B:
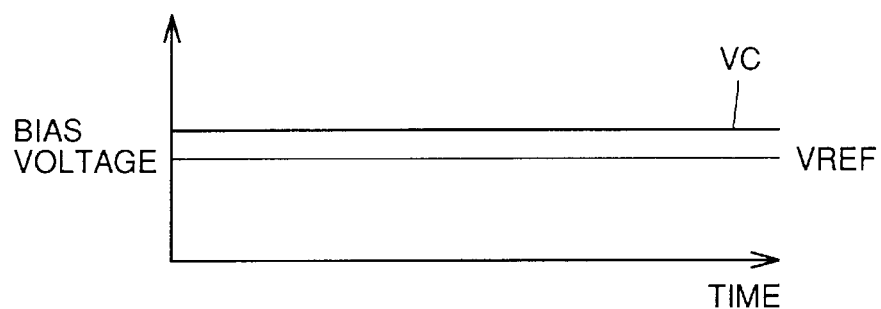
Figure 6C:
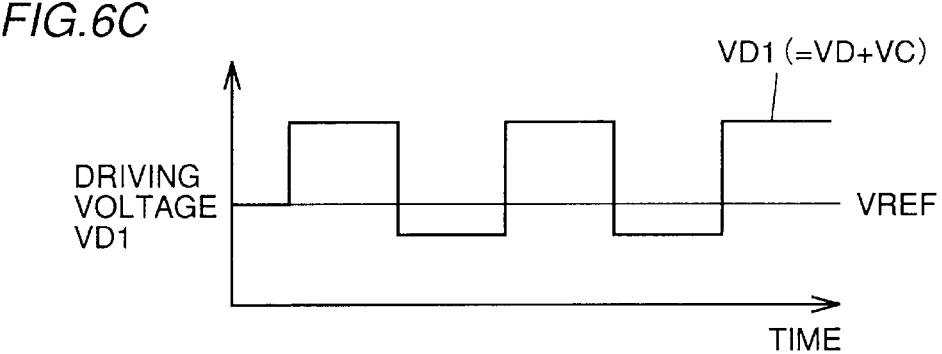

FIGS. 6A to 6C are timing charts for describing the operation of correction with respect to driving signal VD.

Figure 21A:
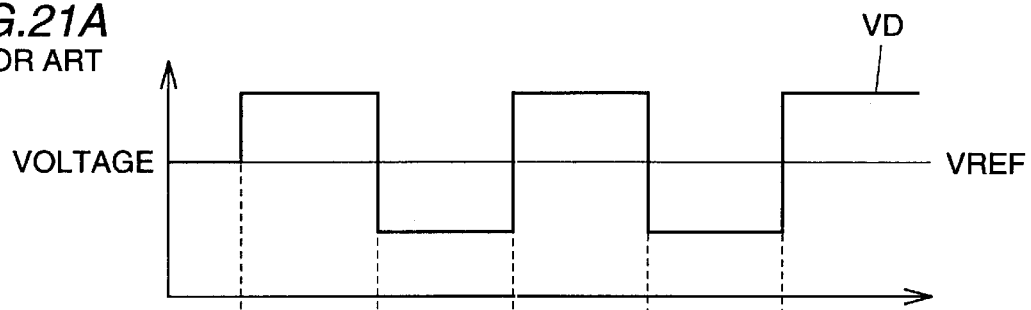
Figure 21B:
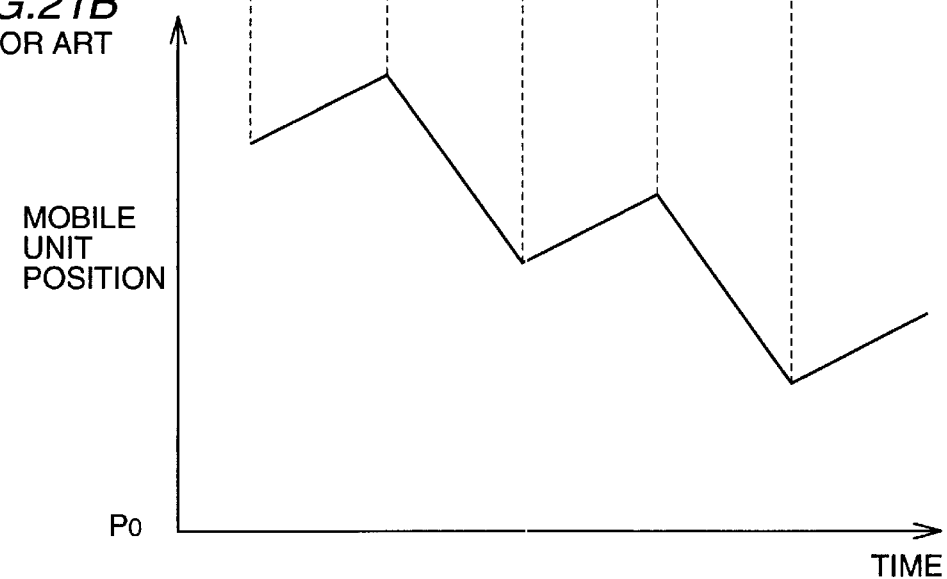
Figure 22:
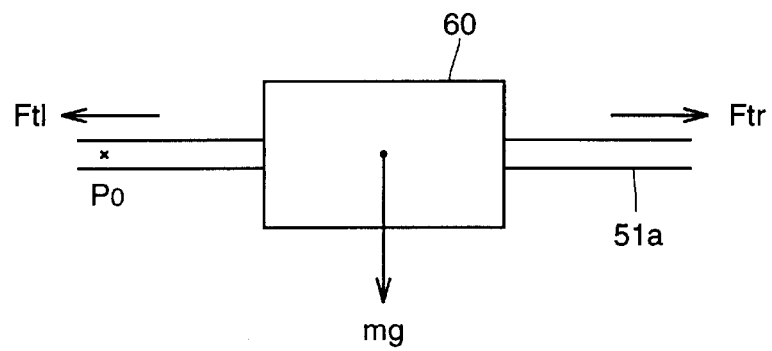
FIG. 22 is a schematic diagram for describing the thrust when the mobile unit is held in a horizontal state.
Figure 23A:
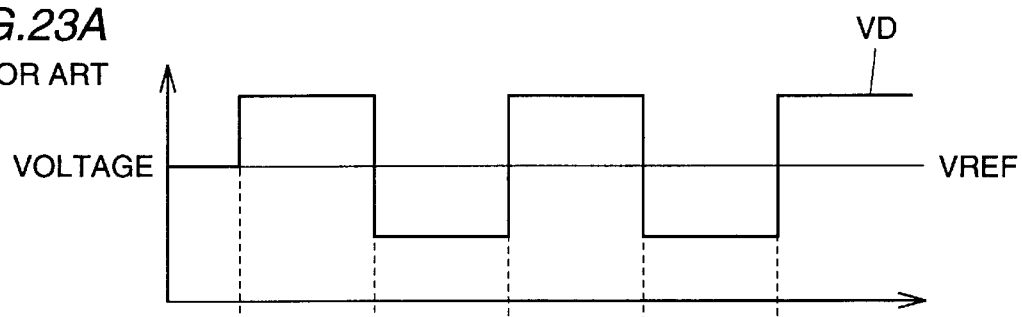
Figure 23B:
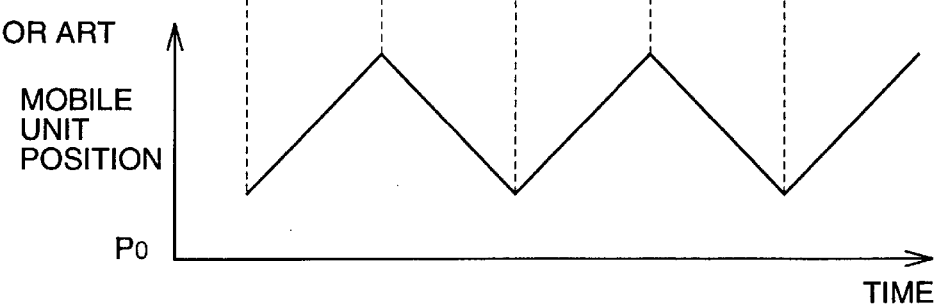

Bias determination circuit 36 provides a correction signal VC which is a direct current voltage signal according to the input difference Dpr. Bias determination circuit 36 is directed to apply correction on driving signal VD to solve the problem of difference in the amount of travel of mobile unit 60 according to the direction of travel caused by the load as shown in FIGS. 21A and 21B even when driving signal VD provided from calculation circuit 6 is of the same level. More specifically, correction voltage VC is generated by applying a direct current voltage value proportional to difference Dpr on reference voltage VREF. That is to say, correction voltage VC shown in FIG. 6B is generated such that VC=VREF+a×Dpr (a is a predetermined constant). Correction signal VC is combined with driving signal VD in adder 38 to generate corrected driving signal VD1. It is to be noted that "a" is a predetermined coefficient (positive value) selected in advance by an experiment.

When mobile unit 60 is moved in a direction identical to the direction of the force by the load as shown in FIG. 4, difference Dpr takes a positive value. Therefore, the level of correction voltage VC is increased as the load becomes greater as shown in FIG. 6B. When correction voltage VC is added to driving signal VD, correcting driving signal VD1 is shifted towards an upper level with respect to reference signal VREF as shown in FIG. 6C. More specifically, the potential difference applied across coil 20 when mobile unit 60 moves rightward is increased, so that the amount of travel of the mobile unit 60 eventually overcomes the action of the increased load. In contrast, the potential difference is reduced when the mobile unit moves in the leftward direction, so that the action of the load is reduced so as to result in a smaller amount of travel. More specifically, an amount of travel identical to that when there is no load can be reliably obtained even when driving signal VD of calculation circuit 6 has the same signal level.

According to the above-described correction, driving signal VD is biased with respect to reference voltage VREF. The amount of travel of mobile unit 60 in the leftward direction and the rightward direction exhibits no difference even when a load is exerted on mobile unit 60. In other words, a displacement equal to that when there is no load can be applied on mobile unit 60.

In FIG. 6A, the signal level of driving signal VD from calculation circuit 6 varies periodically with respect to reference voltage VREF. However, this is provided for the sake of describing the correction operation, and in an actual in-focus operation, the focus evaluation value shows a tendency of increase with driving signal VD of a constant level output from calculation circuit 6 during the travel of CCD 2 in one direction. When the focus evaluation value exhibits a transition toward a smaller value to necessitate change in the direction of travel, the level of driving signal VD will attain an opposite polarity with respect to reference voltage VREF.

Predetermined time period t is set shorter then one field period (1/60 sec). Therefore, while driving signal VD of a voltage level determined on the basis of a focus evaluation value of a certain field is output from calculation circuit 6, determination of a bias value with respect to this driving signal VD is completed. Several bias determination operations may be carried out within one field period.

In the first embodiment, detection of the amount of load and correction of the amount of travel were described in the case where mobile unit 60 attains a moving state. However, an operation identical to that of no load can be implemented when a load is actually exerted, i.e. positioning at a constant position can be implemented by considering that a predicted position is equal to the initial position even when mobile unit 60 is still.

SECOND EMBODIMENT

Figure 7:
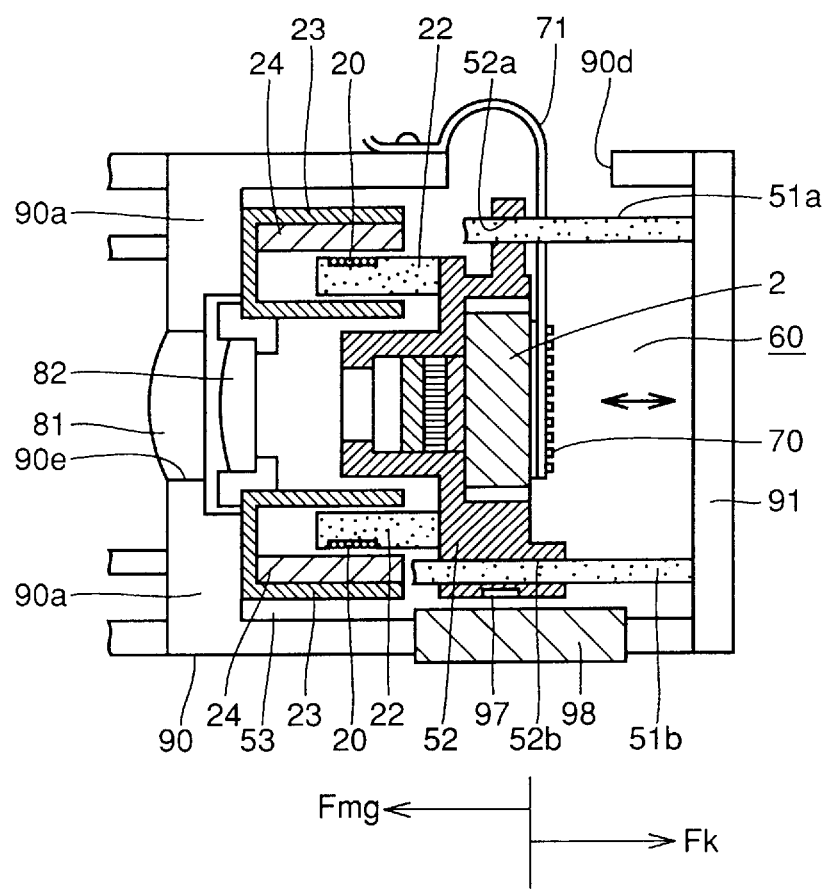
FIGS. 7 and 8 are partial sectional views of an autofocus video camera according to a second embodiment and a third embodiment, respectively, of the present invention.

The first embodiment was described having a structure in which the direction of action of load by the attraction force due to the magnetic force between permanent magnet 24 and lead unit 70 is equal to the direction of action of the load due to the elasticity of cable 71. FIG. 7 is a partial sectional view of an automatic focus adjustment device 102 of an autofocus video camera according to a second embodiment of the present invention. In the second embodiment, cable 71 is oriented so that the direction of action of the load by the attraction due to the magnetic force between permanent magnet 24 and lead unit 70 cancels the direction of action of the driving direction due to elasticity of cable 71. More specifically, cable 71 is bent leftward from the side of connection with CCD 2 and extends out so as to be fixed on the upper surface of fixed base 90. In this case, loads Fmg and Fk act in the opposite direction of 180°, so that composite force (Fmg+Fk) can be reduced significantly in comparison with the case where the load acts in one direction. By arranging the loads so as to cancel each other, the correction operation with respect to driving signal VD in the first embodiment can be minimized. This leads to improvement of the control ability of moving or maintaining mobile unit 60 at the in-focus position.

THIRD EMBODIMENT

In the second embodiment, the load caused by the elasticity of cable 71 can be reduced by reducing a bend in the cable such as by extending cable 71 in a upright direction, or by selecting a material of low elasticity for the cable. Therefore, only the load due to the attraction force between permanent magnet 24 and lead unit 70 has to be considered. In this case, the position data from the position detector 30 is substituted into a predetermined equation to calculate the load caused by the attraction force. The third embodiment is directed to a structure of calculating the load by an arithmetic expression.

Figure 8:
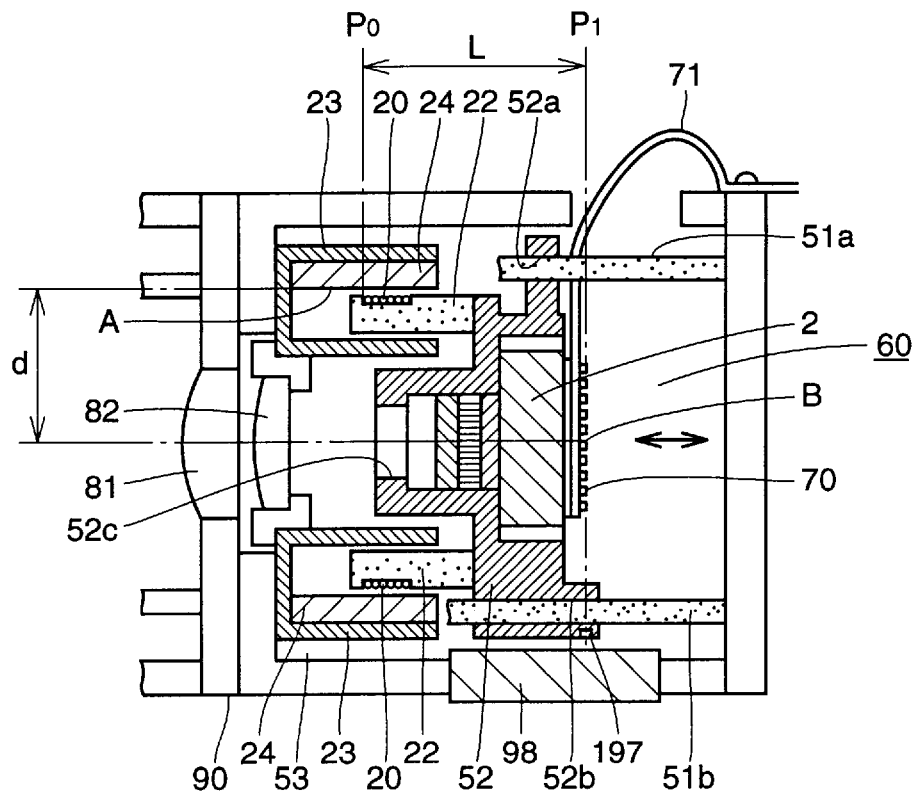

The position of mobile unit 60 in the direction of the optical axis and the load due to an attraction force generated between permanent magnet 24 and lead unit 70 will be described hereinafter with reference to FIGS. 8 and 9 for the purpose of providing the aforementioned arithmetic expression. For the sake of simplification, attention is focused on only one of the four permanent magnets 24. As shown in FIG. 8, the point where the magnetic force of permanent magnet 24 acts is set to middle point A in the optical axis direction, and the point where the magnetic force of lead unit 70 acts is set to middle point B of the direction at right angles with the direction of the optical axis (vertical direction). In the following, it is assumed that the attraction force between permanent magnet 24 and lead unit 70 is generated between A and B.

Figure 9:
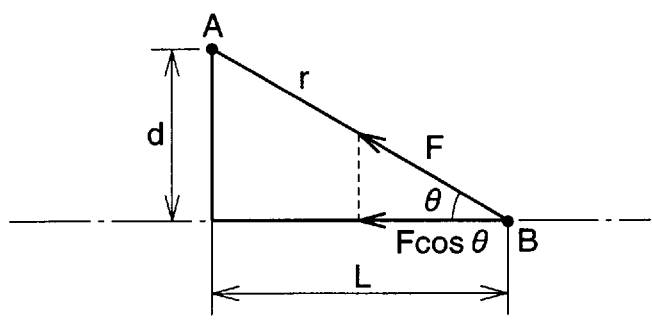
FIG. 9 is a schematic diagram showing the amount of load applied on a driving unit due to a magnetic force according to the third embodiment.

FIG. 9 shows the relationship between the position of points A and B. In FIG. 9, the distance d from point A to the optical axis, i.e. the distance between permanent magnet 24 and the optical axis, and position P0 of point A in the optical axis direction are preset during the design stage of the camera unit. The distance between AB in the optical axis direction is L, the distance between AB is r, and the angle of the segment connecting points AB with the optical axis is θ. Furthermore, the permeability of air in the camera unit is μm, the intensity of the magnetic pole of permanent magnet 24 is m1, and the intensity of the magnetic pole of the magnetized lead unit 70 is m2. Here, the force F at point B acting toward point A can be calculated as the following equation (1) according to Coulomb's law.

It is appreciated from FIG. 9 that the distances d $$F = \frac{m1 \times m2}{4\pi\mu r^2} \quad (1)$$

and L correspond to the lengths of the two sides of a right-angled triangle. Therefore, the following equation (2) is established.

$$r^2 = d^2 + L^2 \quad (2)$$

Since the load of mobile unit 60 corresponds to component F×cosθ in the optical axis direction of force F, the following equation (3) can be derived as force F×cosθ from equations (1) and (2).

$$F \times \cos\theta = \frac{m1 \times m2}{4\pi\mu \times (d^2 + L^2)} \times \cos\theta = \frac{m1 \times m2 \times L}{4\pi\mu \times (d^2 + L^2)^{3/2}} \quad (3)$$

Furthermore, since four permanent magnets 24 are provided, the component of the force in the optical axis direction acting on lead unit 70 is four times the value of equation (3). Therefore, load Fm caused by the attraction force is obtained by the following equation (4).

$$Fm = 4 \times F \times \cos\theta = \frac{m1 \times m2 \times L}{\pi\mu \times (d^2 + L^2)^{3/2}} \quad (4)$$

All the values other than distance L in equation (4) are present during the design stage. Therefore, only the distance L, that changes according to the travel of mobile unit 60 in the direction of the optical axis, is variable. In other words, load Fm can be obtained by the above equation (4) if distance L is identified.

In the above equation (4), attention is focused only on middle point B on the optical axis in lead unit 70 of CCD 2. In practice, several lead units 70 are provided. Therefore, a similar design is required for each lead unit. However, there is no great difference even when middle point B is calculated as an average position by equation (4).

In order to obtain more accurate control, a structure can be employed by empirically obtaining the relationship between the position of mobile unit 60 and the load whereby the load is then empirically calculated.

Figure 10:
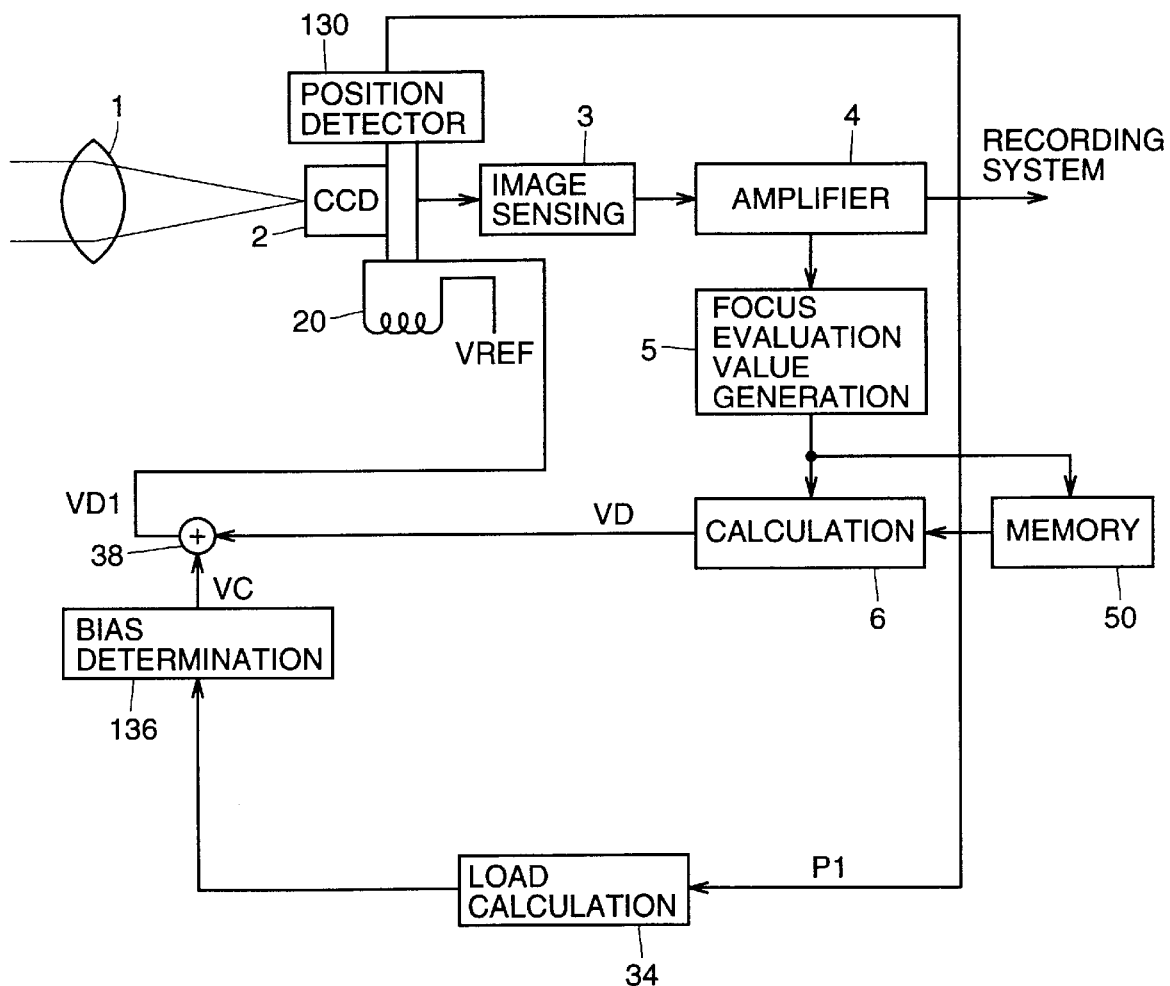
FIGS. 10 and 11 are block diagrams showing an autofocus video camera according to a third embodiment and a fourth embodiment, respectively, of the present invention.

FIG. 10 is a block diagram schematically showing a structure of automatic focus adjustment device 104 of an autofocus video camera according to a third embodiment, of the invention. Automatic focus adjustment device 104 of the third embodiment differs from automatic focus adjustment device 100 of the first embodiment in the following two features.

First, LED 197 fixed to mobile base 52 is disposed on a line at right angles with the optical axis on which lead unit 70 is provided in position detector 130 as shown in FIG. 8 so as to accurately detect the position of lead unit 70 of CCD 2 in the direction of the optical axis.

Second, a load calculation circuit 34 calculates a value corresponding to the load according to an output from position detector 130.

Position data P1 of lead unit 70 from position detector 130 is applied to load calculation circuit 34. Load calculation circuit 34 subtracts position P0 of the preset point A in the optical axis direction from position P1, i.e. calculates distance L by L=P1–P0. By inserting the value of distance L into equation (4), load calculation circuit 34 calculates the amount of load Fm. A value corresponding to the amount of load Fm is provided to bias determination circuit 136.

Bias determination circuit 136 generates a bias value, which is empirically determined through prior experimentation and stored therein, according to amount of load Fm. Therefore, when amount of load Fm is applied from load calculation circuit 34, a required bias value is determined and output. Adder 38 adds correction signal Vc from bias determination circuit 136 as a bias value to driving signal VD.

According to the above-described automatic focus adjustment device that carries out focus adjustment by moving CCD 2 in the direction of the optical axis by a linear motor, influence of a load can be suppressed so that CCD 2 can be operated in a manner similar to that when there is no load. Therefore, there is no variation in the amount of travel of CCD 2 per unit time even though the direction of travel differs.

Furthermore, the amount of load can easily be calculated by just detecting the position of CCD 2 in the direction of the optical axis. Influence of the load can be suppressed with an extremely simple structure.

FOURTH EMBODIMENT

Figure 11:
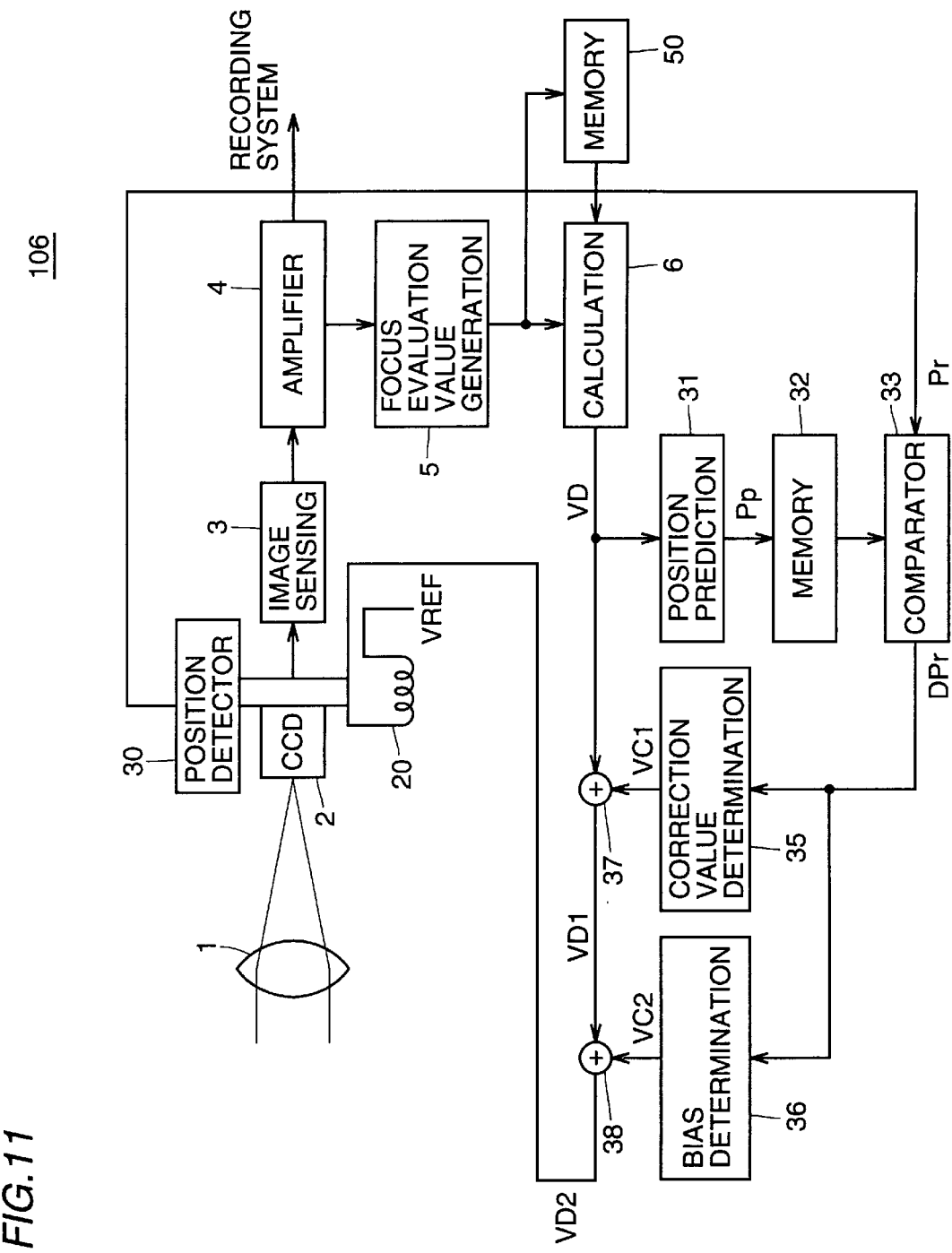

FIG. 11 is a block diagram schematically showing a structure of an automatic focus adjustment device 106 of the fourth embodiment. Automatic focus adjustment device 106 differs from automatic focus adjustment 100 of the first embodiment in the following points.

Comparator circuit 33 calculates the amount of tilt from the horizontal state of the optical axis according to a difference Dpr between predicted position data Pp predicated by position prediction circuit 31 according to driving signal VD provided from calculation circuit 6 and actual measured position data Pr detected by position detector 30 (Dpr=Pp–Pr). Value Dpr, corresponding to the amount of tilt from the horizontal state of the optical axis, is applied to correction value determination circuit 35 and bias determination circuit 36. Correction value determination circuit 35 provides a first correction signal VC1 in response to the direction of tilt. Adder 37 receives driving signal VD and the first correction signal VC1 to provide the added result as a first corrected driving signal VD1.

Bias determination circuit 36 provides a second correction signal VC2 of a constant value according to the absolute value of the amount of tilt. Adder 38 receives signal VD1 and second correction signal VC2 to provide the added result as second corrected driving signal VD2. The position of mobile unit 60 is controlled according to second corrected driving signal VD2.

An operation of automatic focus adjustment device 106 of the fourth embodiment will be described hereinafter.

The relationship between difference Dpr calculated by comparator circuit 33 and the amount of tilt of the optical axis will first be described. Assuming that the difference Dpr between predicated position data Pp and actual measured position data Pr is approximately 0, the equation of Kp=Kr is established between the predicted amount of travel Kp and the actual amount of travel Kr. In this case, it is considered that mobile unit 60 attains a substantially horizontal state.

Figure 12:
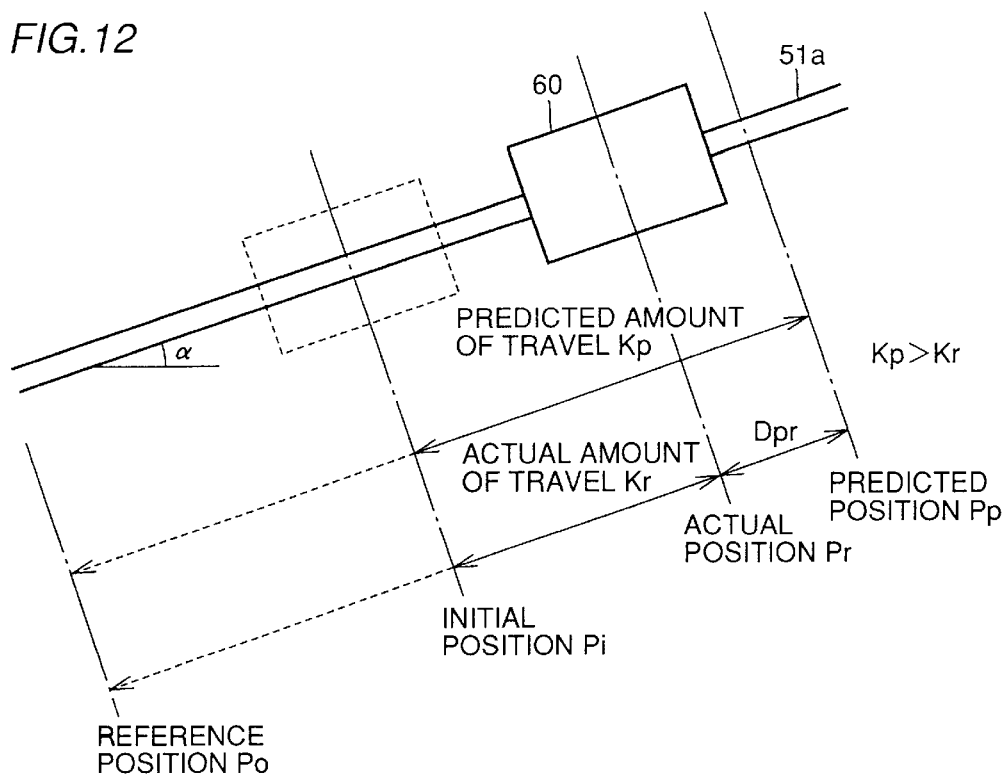
FIGS. 12 and 13 are schematic diagrams showing the relationship between a predicted position and an actual measured position when the mobile unit is tilted upward and downward, respectively, in the right direction.
Figure 13:
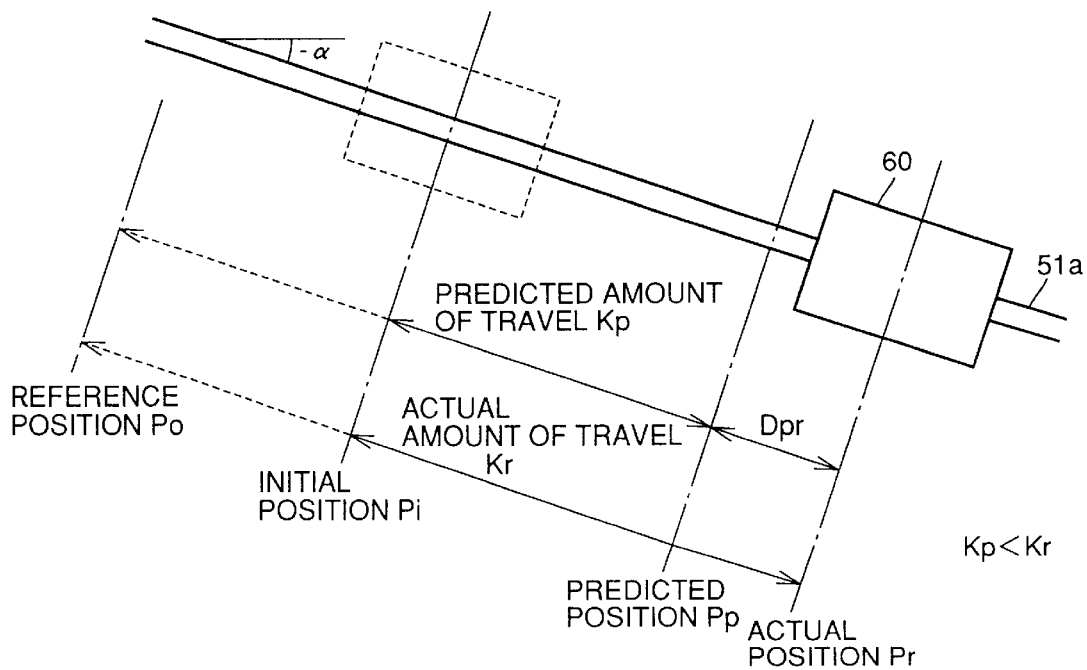

When difference Dpr between predicted position data Pp and actual measured position data Pr is positive, the relationship of Kp>Kr is established between predicted amount of travel Kp and the actual measured amount of travel Kr. In this case, it is considered that mobile unit 60 is tilted by a certain angle of α as shown in FIG. 12. When difference Dpr between predicated position data Pp and actual measured position data Pr is negative, the relationship of Kp<Kr is established between predicated amount of travel Kp and the actual amount of travel Kr. It is considered that mobile unit 60 is tilted by a certain angle (–α) as shown in FIG. 13. It is considered that the tilting angle of mobile unit 60 becomes greater as the absolute value |Dpr|=|Pp–Pr| of the difference between predicated position data Pp and actual measured position data Pr is increased. By obtaining the relationship of magnitude and difference between predicated position data Pp and actual measured position data Pr, the tilted state of mobile unit 60 can be predicted.

In FIGS. 12 and 13, the initial value refers to the position of mobile unit 60 before a predetermined time t. The actual measured position refers to the position of mobile unit 60 that is actually displaced by driving signal VD from calculation unit 6 at an elapse of a predetermined time t.

Here, the distance from reference position P0 is expressed as actual measured position data Pr. Predicated position Pp refers to the position where mobile unit 60 located at the initial position is expected to be located after predetermined time t by position prediction circuit 31. Here, the distance from reference position P0 is expressed as predicted position data Pr.

An operation of automatic focus adjustment device 106 will be described hereinafter.

Correction value determination circuit 35 and bias determination circuit 36 generate correction signals VC1 and VC2, respectively, according to the difference value Dpr provided from comparator circuit 33. The voltages of these correction signals are superimposed on driving signal VD output from calculation circuit 6 to correct the current driving signal VD. FIGS. 14A to 14E show the corrections of this driving signal.

Figure 14A:
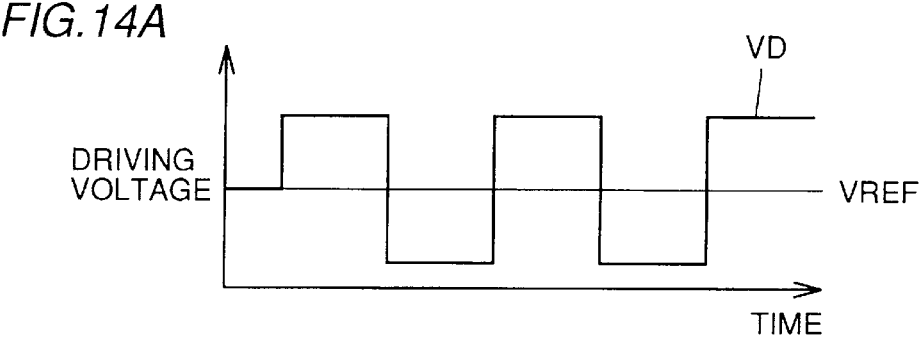
Figure 14B:
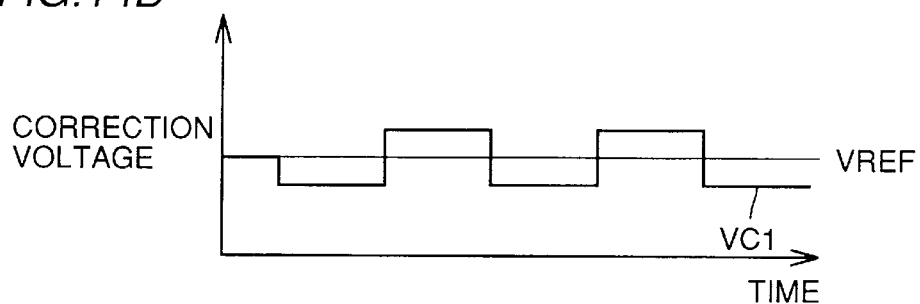

Correction value determination circuit 35 responds to an input difference value Dpr to provide a first correction signal VC1 as shown in FIG. 14B of a phase opposite to that of driving signal VD provided as shown in FIG. 14A with respect to reference voltage VREF. Here, correction value determination circuit 35 carries out correction so that the potential difference between driving signal VD and reference voltage VREF is reduced as the amount of tilt becomes greater taking into consideration that the influence of the frictional force between support shaft 51a (only 51a of support shafts 51a and 51b is considered for simplification) and mobile unit 60 is smaller in a tilted state than in a horizontal state, which is more appreciable as the amount of tilt is greater. More specifically, the level of first correction signal VC1 is set so that the potential difference |VREF−VC1| between first correction signal VC1 and reference signal VREF is proportional to the absolute value of difference value Dpr corresponding to the amount of tilt, i.e. so that |VREF−VC1|=a×|Dpr| is established. In the above equation, a is a constant coefficient which is selected in advance by an experiment.

Figure 14C:
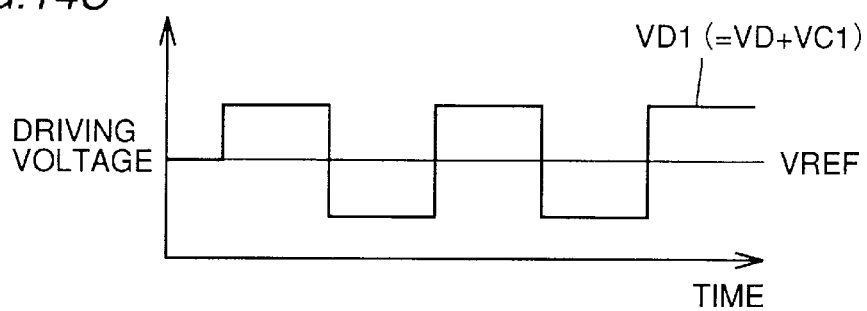

The set first correction signal VC1 is superimposed on driving signal VD by adder 37. As a result, first corrected driving signal VD1 is generated as shown in FIG. 14C. The potential difference between driving voltage VD1 and reference voltage VREF is reduced, whereby the amount of current conducted to coil 20 becomes smaller. Therefore, the amount of travel of mobile unit 60 per unit time decreases in an inverse proportion to difference value Dpr. A displacement equal to that of a horizontal state can be applied to mobile unit 60 even when the frictional force between mobile unit 60 and support shaft 51 becomes smaller than that of a horizontal state due to a tilt of mobile unit 60 as long as the component of the force of gravity in the direction of displacement is neglected.

An operation of bias determination circuit 36 compensating for influence of the component of force of gravity in the direction of displacement will now be described.

Figure 14D:
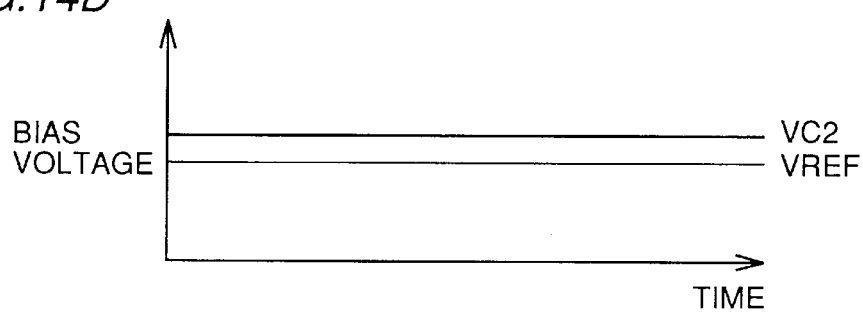
Figure 24:
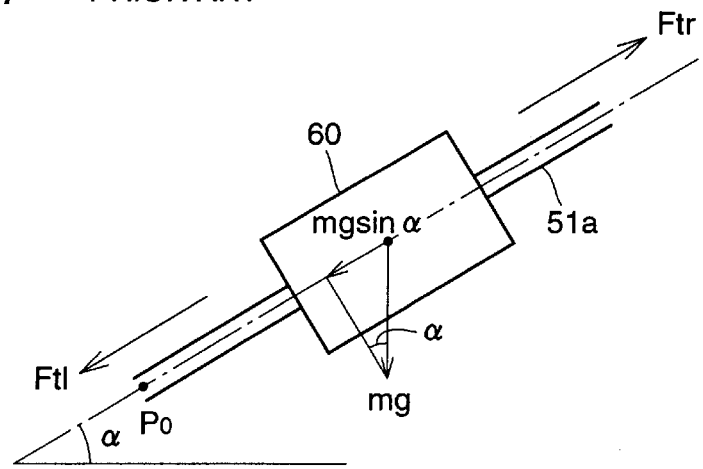
FIG. 24 is a schematic diagram for describing the thrust generated when the mobile unit is tilted.
Figure 25A:
Figure 25B:
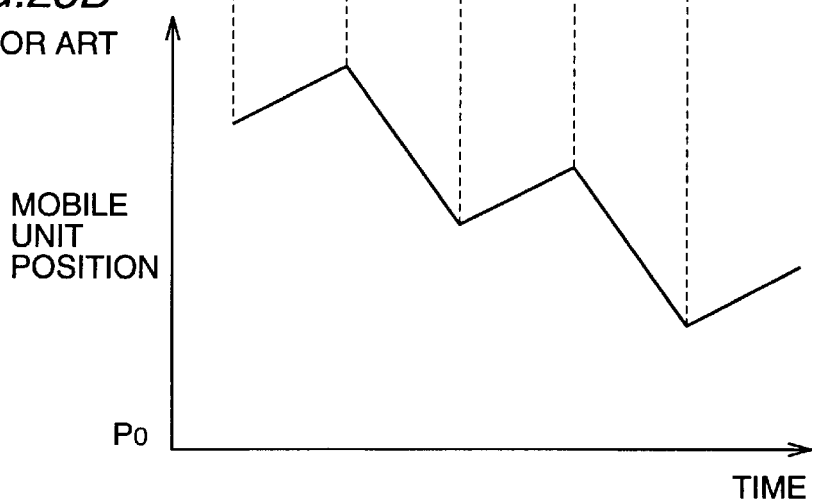
Figure 26:
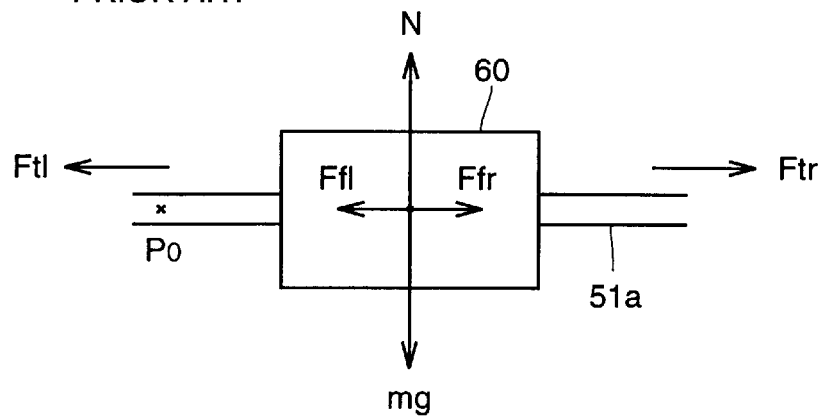
FIG. 26 is a schematic diagram for describing a frictional force generated when the mobile unit is held in a horizontal state.
Figure 27A:
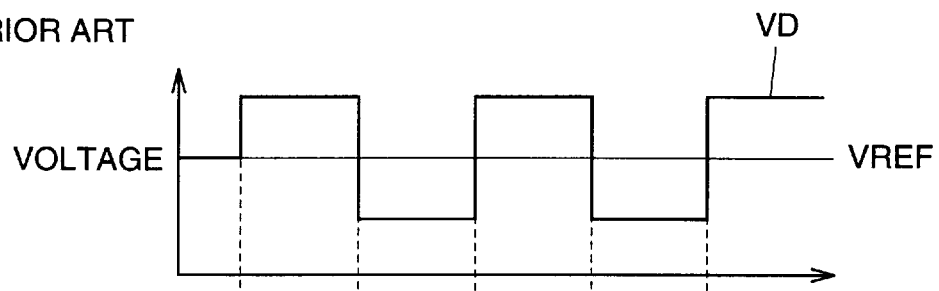
Figure 27B:
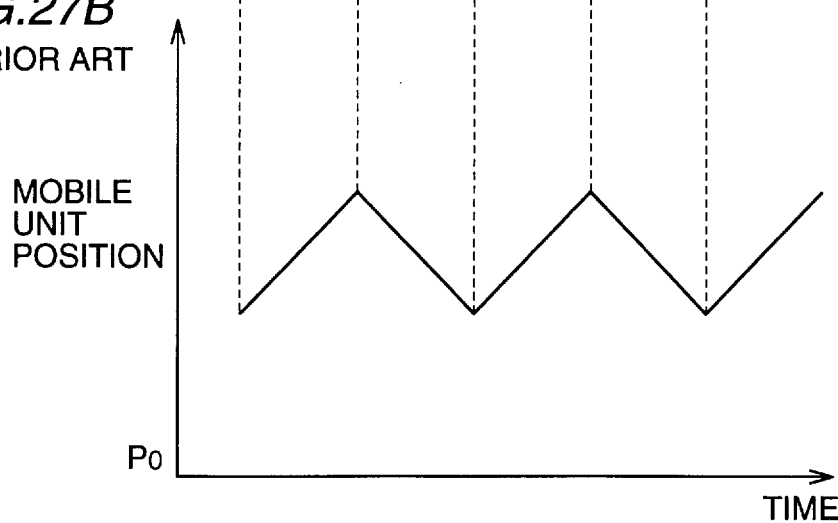
Figure 28:
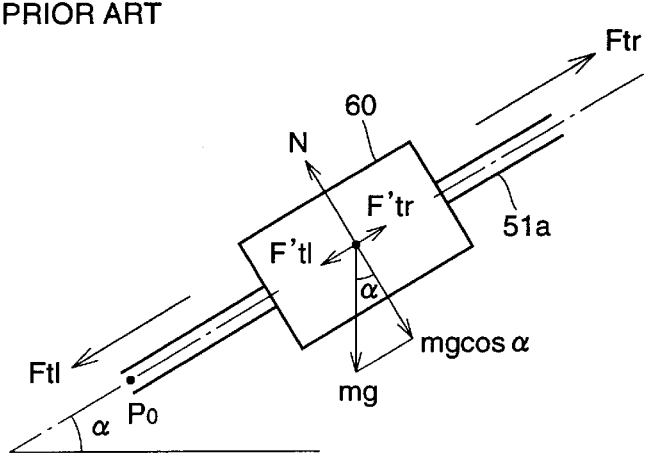
FIG. 28 is a schematic diagram for describing a frictional force generated when the mobile unit is tilted.
Figure 29A:
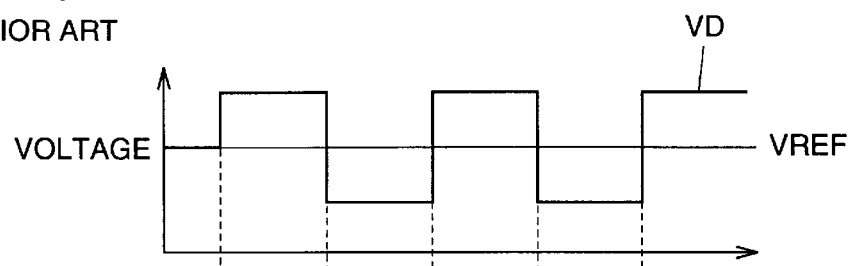
Figure 29B:
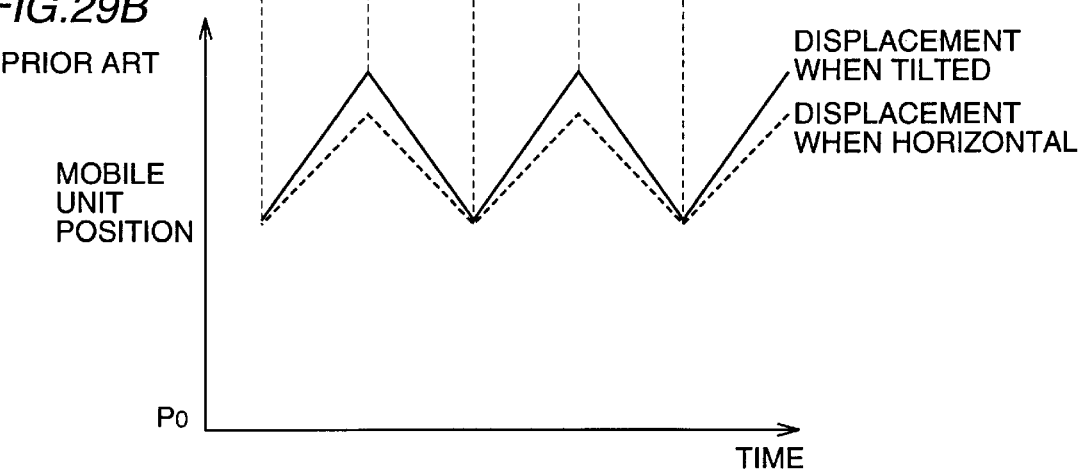

Bias determination circuit 36 responds to an input difference value Dpr to provide a second correction signal VC2 which is a direct current voltage signal. Bias determination circuit 36 is directed to correct driving signal VD by suppressing the generation of difference in the amount of travel of mobile unit 60 according to which of a rising direction (rightward) or a falling direction (leftward) of the tilting plane mobile unit 60 moves due to the component of force in the direction of displacement of gravity as described already with reference to FIGS. 24, 25A and 25B even when the absolute value of driving signal VD provided from calculation circuit 6 is identical. More specifically, second correction voltage VC2 is generated by adding a voltage value proportional to the difference value Dpr to reference voltage VREF. More specifically, second correction voltage VC2 as shown in FIG. 14D is provided so that the equation of VC2=VREF+b×Dpr is established. Second correction signal VC2 is superimposed on corrected driving signal VD1 in adder 38 in order to produce a second corrected driving signal VD2. The above b is a coefficient selected in advance by an experiment.

Figure 14E:
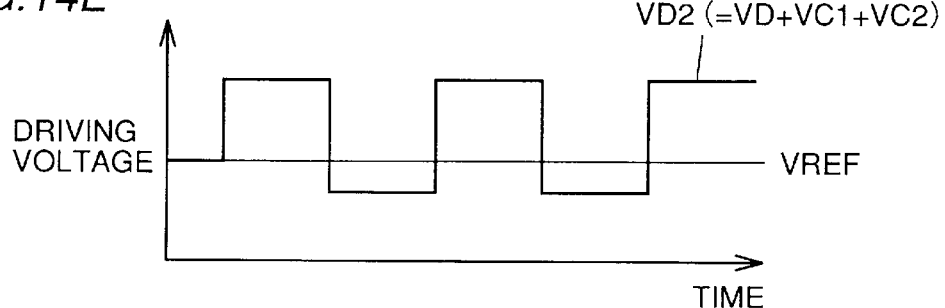
Figure 15:
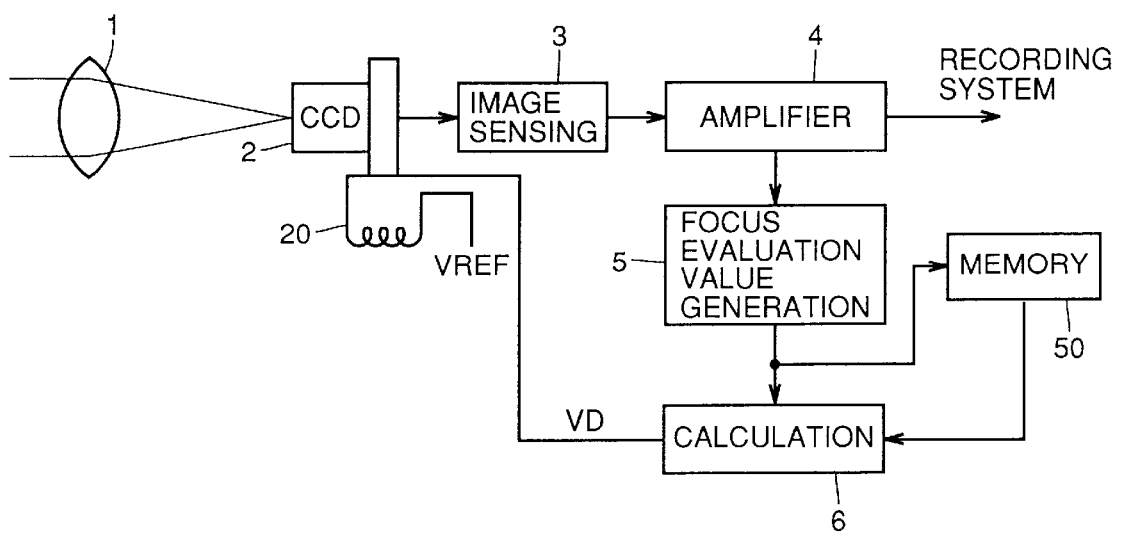
FIG. 15 is a schematic block diagram showing a structure of an automatic focus adjustment device of a conventional autofocus video camera.
Figure 16:
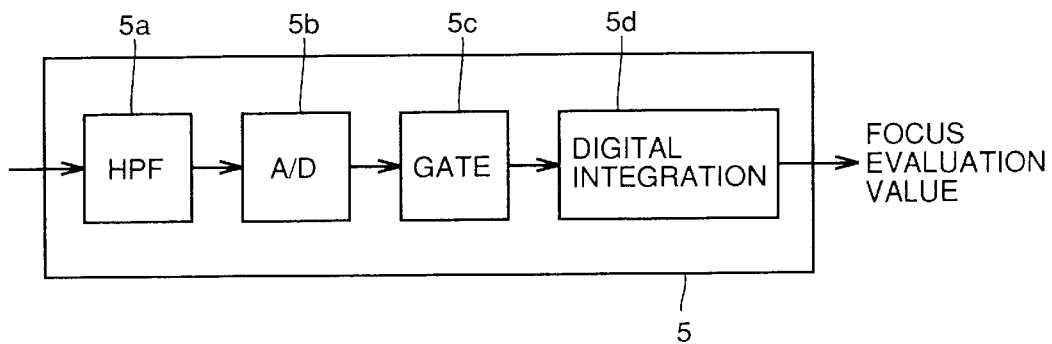
FIG. 16 is a schematic block diagram showing a structure of a focus evaluation value generation circuit 5.

When mobile unit 60 is tilted by an angle of a as shown in FIG. 12, difference value Dpr when mobile unit 60 is moved rightward is positive. Therefore, the level of second correction voltage VC2 becomes larger than reference voltage VREF as the amount of tilt is increased as shown in FIG. 14D. When this second correction value VC2 is superimposed on first corrected driving signal VD1, second corrected driving signal VD2 is shifted to an upper level with respect to reference voltage VREF as shown in FIG. 14E. In other words, the potential difference applied across coil 20 increases whenever mobile unit 60 moves rightward in an upward tilt. As a result, the amount of travel of mobile unit 60 to overcome the action of gravity to increases. Conversely, the potential difference is reduced when mobile unit 60 moves leftward in a downward tilt. Therefore, the action of gravity is suppressed so as to reduce the amount of travel. An amount of travel identical to that of a horizontal state can be reliably obtained even when the potential level of driving signal VD of calculation circuit 6 is identical.

As shown in FIG. 13, difference value Dpr takes a negative value when mobile unit 60 is tilted by an angle of (−α). Therefore, the level of second correction signal VC2 becomes less than that of reference voltage of VREF as the amount of tilt becomes greater. When this is superimposed on first corrected driving signal VD1, second corrected driving signal VD2 is shifted to a relatively lower level with respect to reference voltage VREF. The potential difference applied across coil 20 thus increases when moving toward the left direction in an upward tilt. More specifically, the amount of travel of mobile unit 60 increases. Conversely, the potential difference when moving rightward in a downward tilt results in a reduced amount of travel. An amount of travel identical to that of a horizontal case can be reliably obtained even when the voltage level of the driving signal VD from calculation circuit 6 is identical to that when mobile unit 60 is horizontal.

As described above, by applying a bias voltage to first corrected driving signal VD1 with respect to reference voltage VREF, difference in the amount of travel between the right direction and the left direction according to a tilt of mobile unit 60 is eliminated. In the control of the amount of travel of mobile unit 60, equal displacement can be applied to mobile unit 60 by virtue of calculation circuit 6 providing driving signal VD equal to that in a horizontal manner.

The operation of automatic focus adjustment device 106 having the voltage level of the driving signal from calculation circuit 6 varied periodically with respect to reference voltage VREF as shown in FIG. 14A is only by way of example to describe the correction operation. In an actual in-focus operation, driving signal VD is provided from calculation circuit 6 so as to move mobile unit 60 in one direction when the automatic focus evaluation value is increasing. When the direction of travel of mobile unit 60 is changed, the level of driving signal VD takes an opposite polarity with respect to voltage VREF.

Detection of the amount of tilt and correction of the amount of travel were described when mobile unit 60 attains a moving state. However, an operation identical to that of a horizontal state can be obtained when mobile unit 60 is tilted, i.e. an operation of positioning mobile unit 60 at a constant position, by assuming that the predicted position is equal to the initial position even in the case where mobile unit 60 is still.

In the present embodiment, lens 1 is fixed, and the distance between lens 1 and CCD 2 is varied by displacing CCD 2 by a voice coil motor 20. Alternatively, CCD 2 may be fixed to vary lens 1 in the direction of the optical axis by voice coil motor 20.

Automatic focus adjustment device 106 of the fourth embodiment can eliminate the influence of gravity and frictional force to operate the mobile unit in a manner similar to that of a horizontal state even when the video camera is tilted upward or downward from the horizontal state during its shooting operation. Therefore, the time required to achieve in-focus state can be reduced in comparison with that of a horizontal state. Thus, a quick in-focus operation can be realized. Furthermore, the in-focus operation can be achieved without difficulty even when the tilted angle is great.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An autofocus video camera comprising:

image sensing means having a lens and an image sensing device, said lens and said image sensing device being oriented along a common optical axis;

a linear motor having either said lens or said image sensing device as a mobile unit, wherein said linear motor displaces said mobile unit along said optical axis and with a driving force according to a level of a driving signal and is driven according to a potential difference between a predetermined reference level and said level of the driving signal;

focus control means for providing said driving signal so that said mobile unit moves towards an in-focus position along said axis;

mobile unit position detection means for detecting a position of said mobile unit in a direction of the optical axis;

load calculation means for determining an amount of driving load acting on said mobile unit in a direction of said optical axis, wherein said load calculation means comprises:

position prediction means for predicting the position at which the mobile unit will arrive after the driving force has been applied thereto by the linear motor for a predetermined time period; and comparator means for determining said amount of driving load in response to comparing a detected result produced by said mobile unit position detection means and a predicted result produced by said position prediction means and in response to a value corresponding to an amount of tilt of said optical axis from a horizontal direction; and level correction means for correcting the level of said driving signal in response to said amount of driving load, wherein said level correction means comprises potential difference reduction means for reducing said potential difference in proportion to an absolute value of the value corresponding to the amount of tilt.

2. An autofocus video camera comprising:

image sensing means having a lens and an image sensing device, said lens and said image sensing device being oriented along a common optical axis;

a linear motor having either said lens or said image sensing device as a mobile unit, wherein said linear motor displaces said mobile unit along said optical axis and with a driving force according to a level of a driving signal and is driven according to a potential difference between a predetermined reference level and said level of the driving signal;

focus control means for providing said driving signal so that said mobile unit moves towards an in-focus position along said axis;

mobile unit position detection means for detecting a position of said mobile unit in a direction of the optical axis;

load calculation means for determining an amount of driving load acting on said mobile unit in a direction of said optical axis, wherein said load calculation means comprises:

position prediction means for predicting the position at which the mobile unit will arrive after the driving force has been applied thereto by the linear motor for a predetermined time period; and comparator means for determining said amount of driving load in response to comparing a detected result produced by said mobile unit position detection means and a predicted result produced by said position prediction means and in response to a value corresponding to an amount of tilt of said optical axis from a horizontal direction; and level correction means for correcting the level of said driving signal in response to said amount of driving load, wherein the level correction means comprises bias superimposing means for superimposing a bias voltage on the driving signal in proportion to the value corresponding to the amount of tilt.

3. An autofocus video camera comprising:

image sensing means having a lens and an image sensing device, said lens and said image sensing device being oriented along a common optical axis;

a linear motor having either said lens or said image sensing device as a mobile unit, wherein said linear motor displaces said mobile unit along said optical axis and with a driving force according to a level of a driving signal and is driven according to a potential difference between a predetermined reference level and said level of the driving signal;

focus control means for providing said driving signal so that said mobile unit moves towards an in-focus position along said axis;

mobile unit position detection means for detecting a position of said mobile unit in a direction of the optical axis;

load calculation means for determining an amount of driving load acting on said mobile unit in a direction of said optical axis, wherein said load calculation means comprises:

position prediction means for predicting the position at which the mobile unit will arrive after the driving force has been applied thereto by the linear motor for a predetermined time period; and comparator means for determining said amount of driving load in response to comparing a detected result produced by said mobile unit position detection means and a predicted result produced by said position prediction means and in response to a value corresponding to an amount of tilt of said optical axis from a horizontal direction; and level correction means for correcting the level of said driving signal in response to said amount of driving load, wherein the level correction means comprises:

potential difference reducing means for reducing said potential difference in proportion to an absolute value of the value corresponding to said amount of tilt; and bias superimposing means for superimposing a bias voltage on said driving signal in proportion to the value corresponding to said amount of tilt.

* * * * *